Dec. 7, 1965  F. T. MacKENZIE ETAL  3,221,967
HEEL ATTACHING MACHINES
Filed Feb. 7, 1963  20 Sheets-Sheet 1

Inventors
Fred T. MacKenzie
Karl V. Becker
Harold G. Peterson
By their Attorney
Douglas R. Buchanan

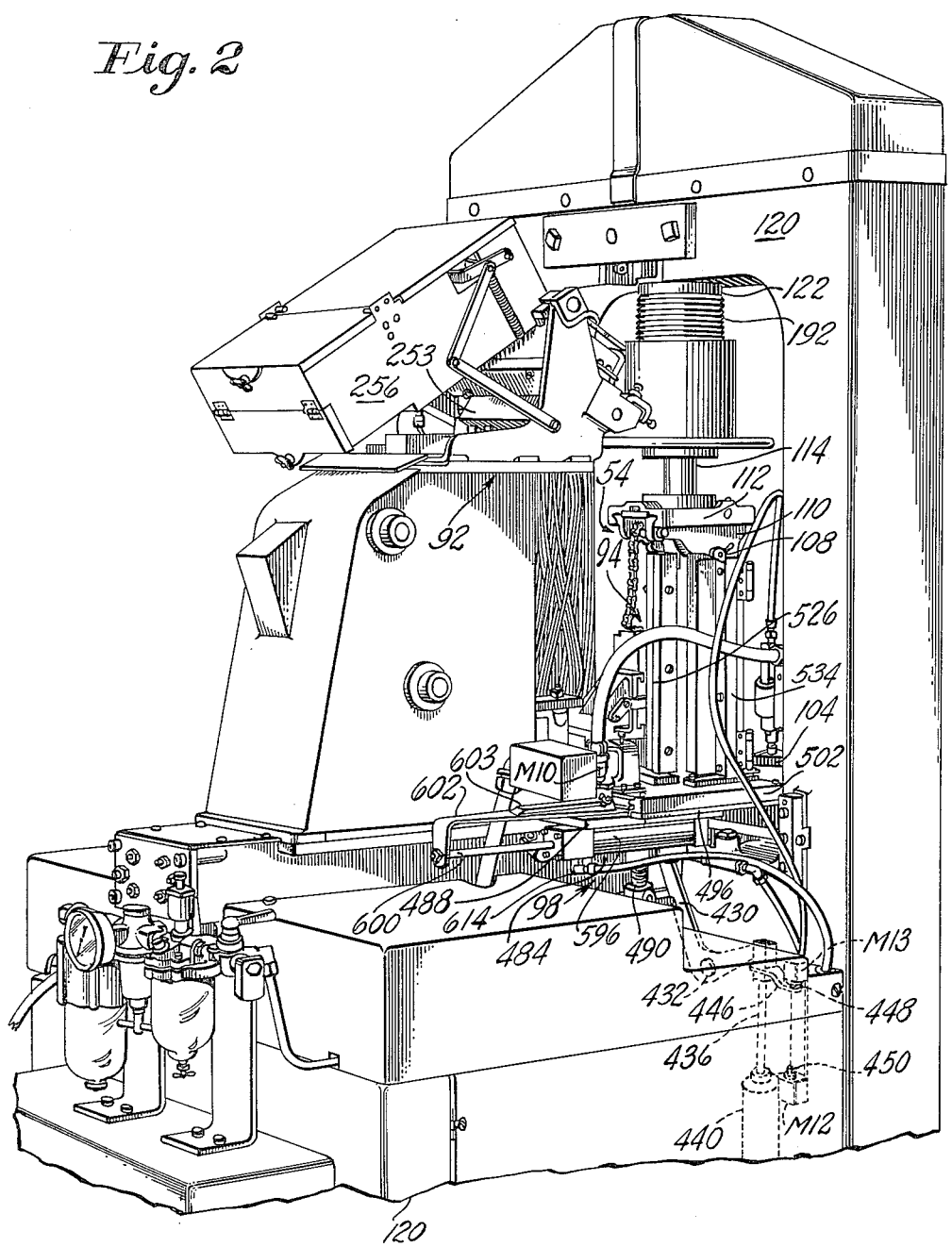

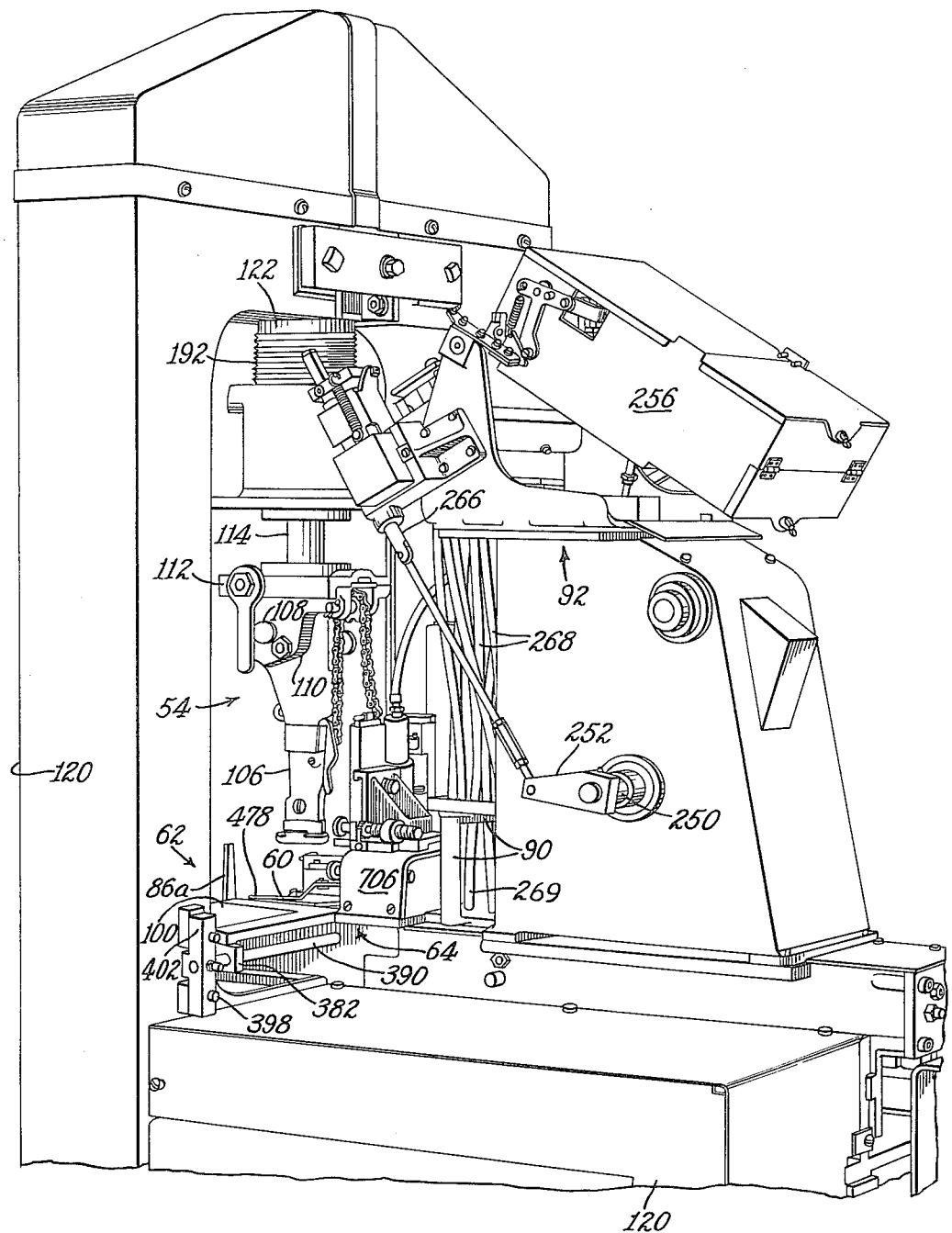

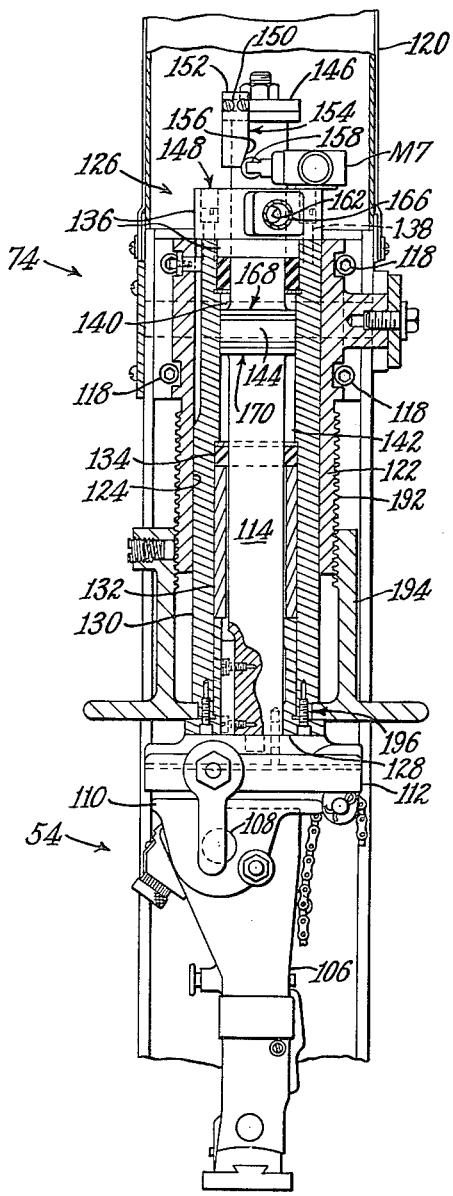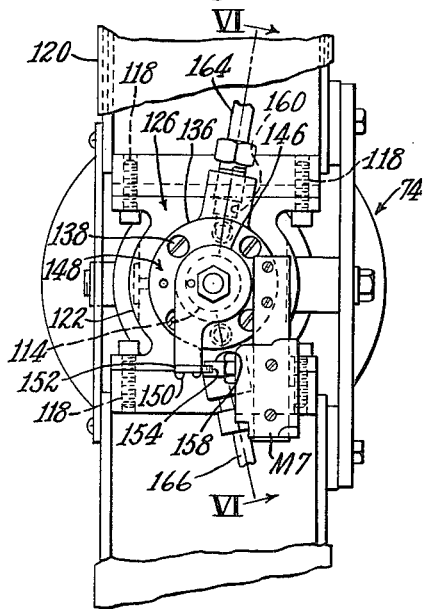

Dec. 7, 1965  F. T. MacKENZIE ETAL  3,221,967
HEEL ATTACHING MACHINES
Filed Feb. 7, 1963  20 Sheets-Sheet 5

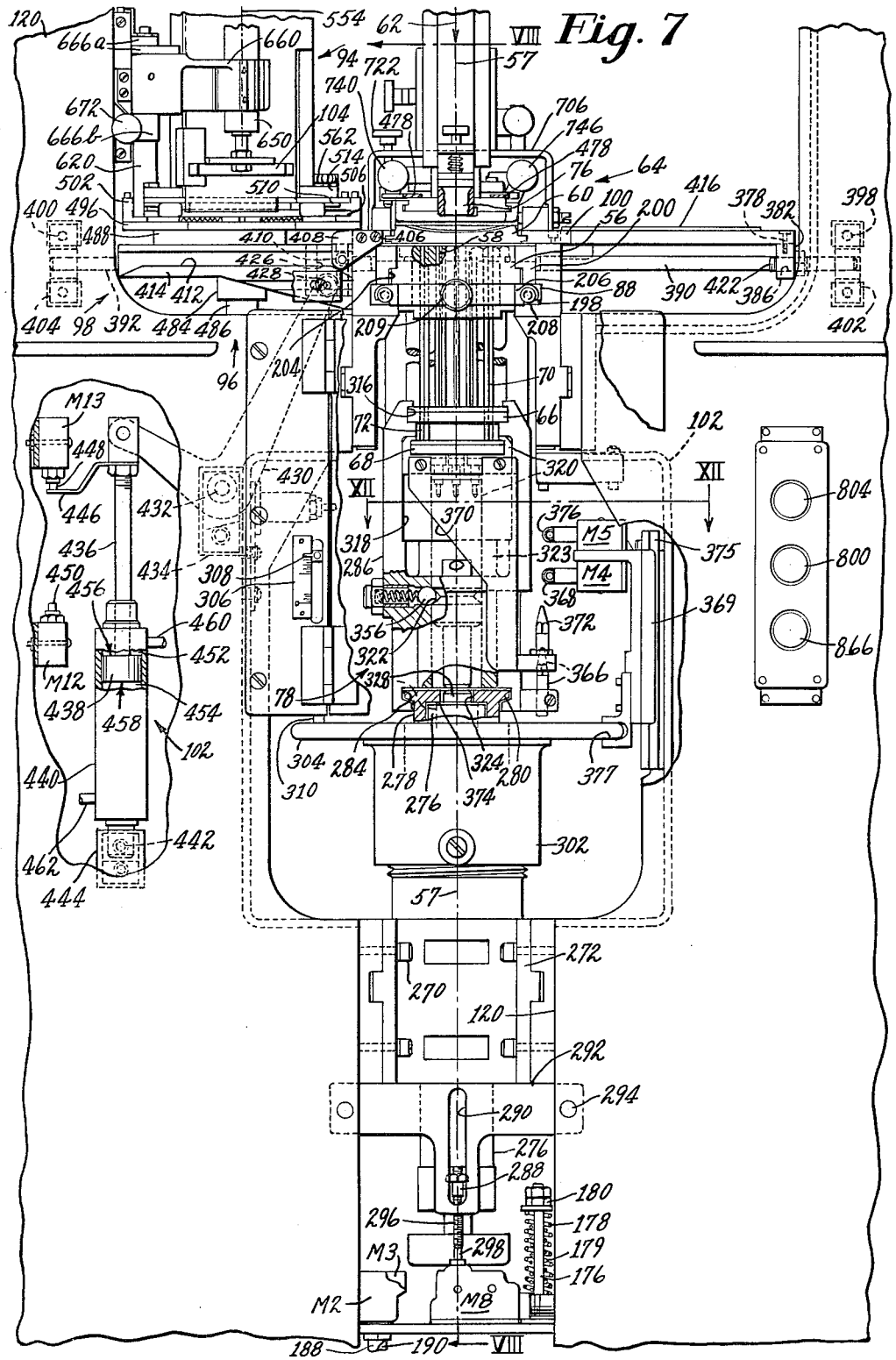

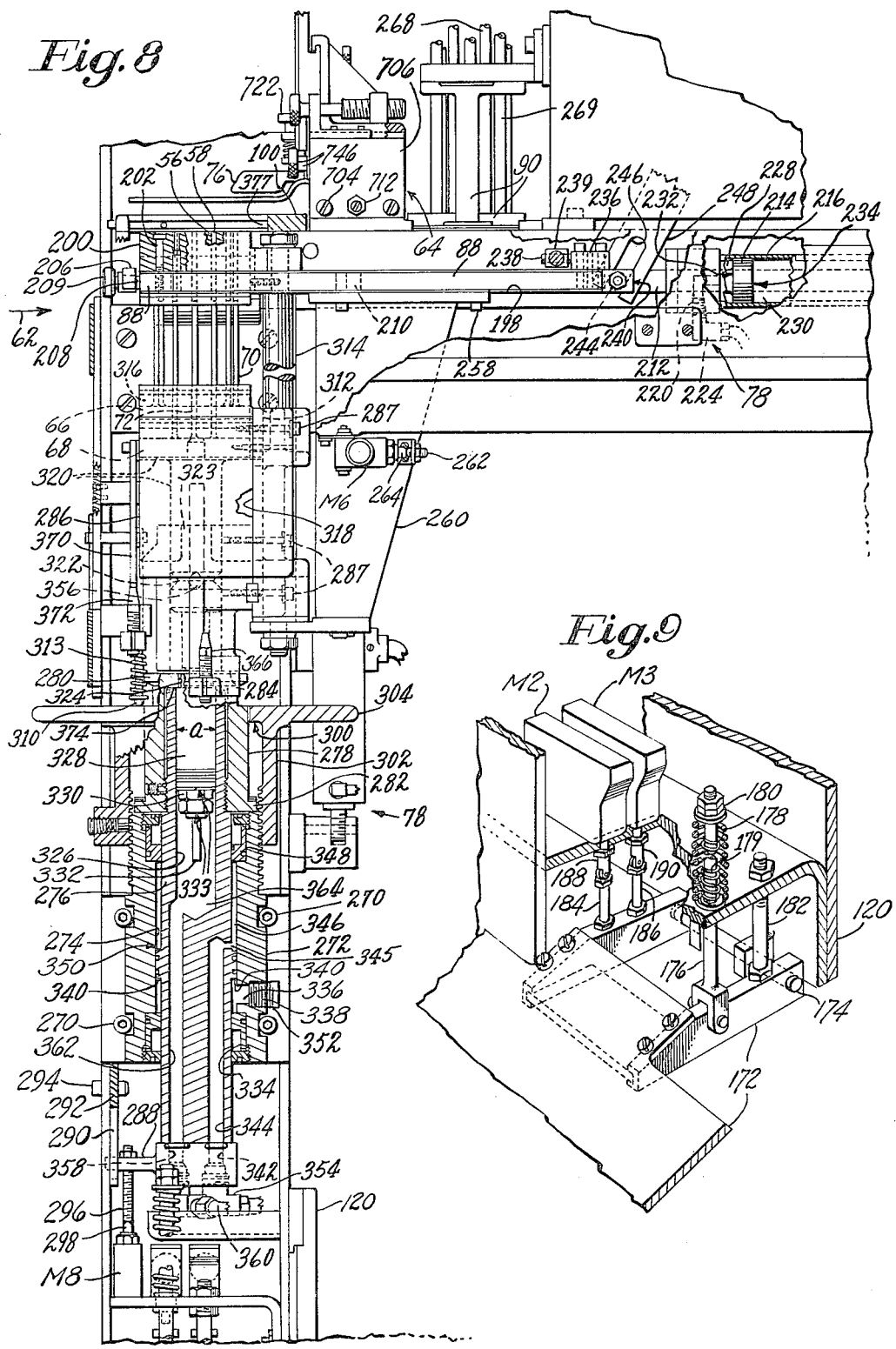

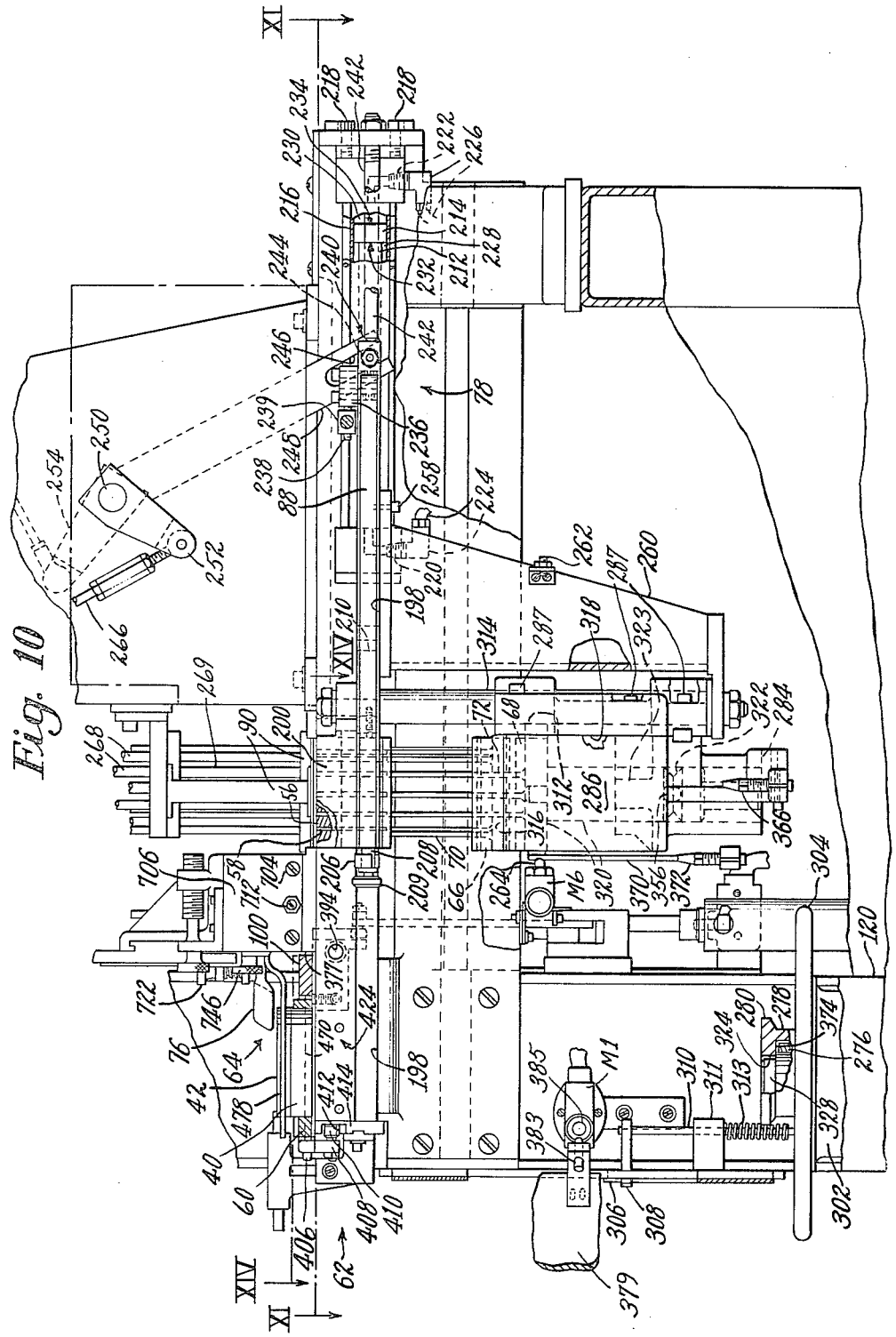

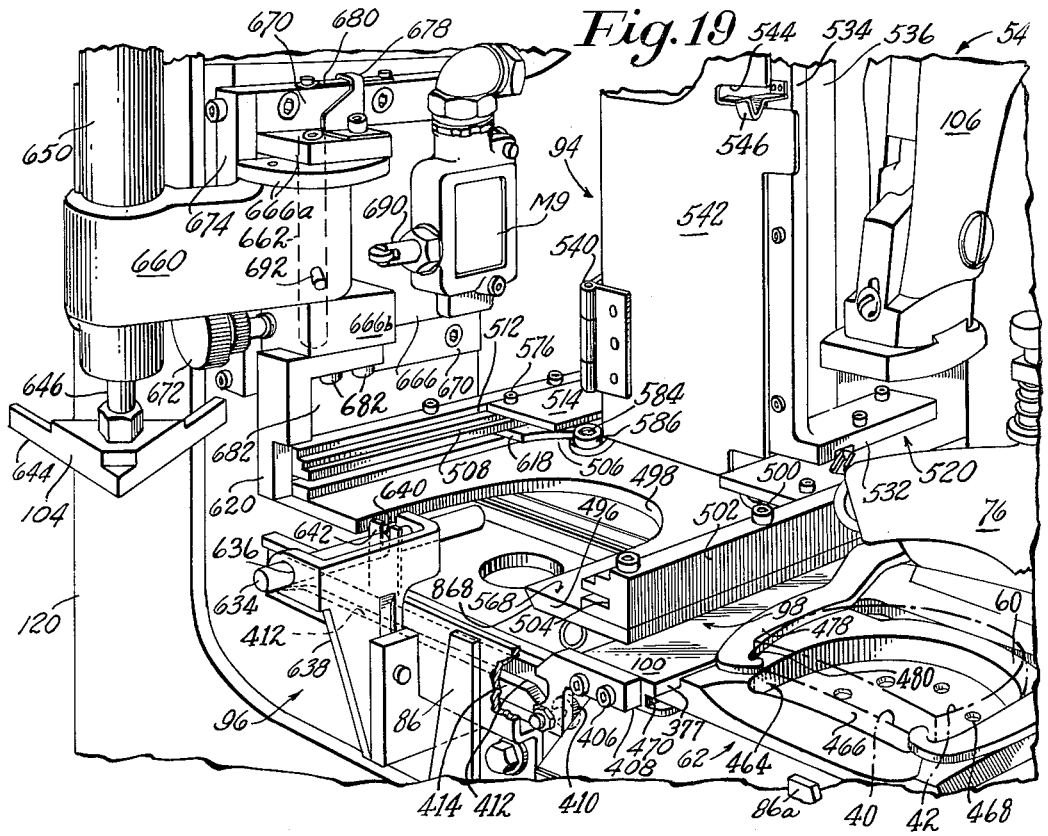
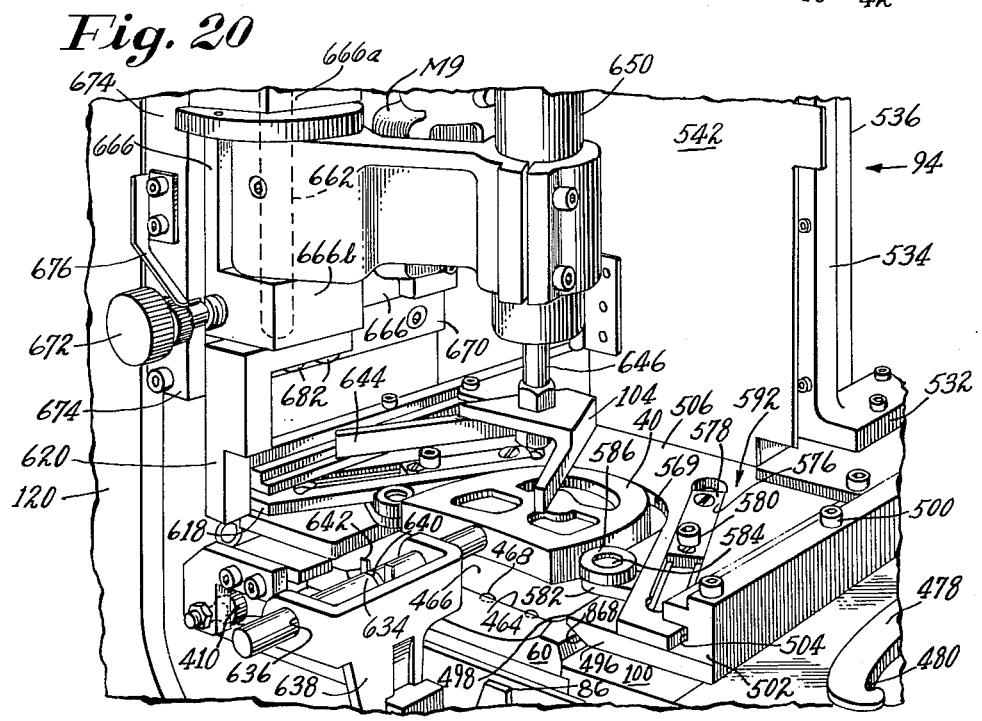

United States Patent Office 3,221,967
Patented Dec. 7, 1965

3,221,967
HEEL ATTACHING MACHINES
Fred T. MacKenzie, Beverly, Karl V. Becker, Boxford, and Harold G. Peterson, Beverly, Mass., assignors to United Shoe Machinery Corporation, Boston, Mass., a corporation of New Jersey
Filed Feb. 7, 1963, Ser. No. 256,885
43 Claims. (Cl. 227—28)

This invention relates to a heel attaching machine, which is of the general type disclosed in United States Letters Patent No. 2,994,882, granted Aug. 8, 1961 on an application filed in the name of William F. MacKenzie et al., and is provided with an automatic rubber heel loader similar in many respects to the automatic heel loader disclosed in United States Letters Patent No. 3,071,775, granted Jan. 8, 1963 on an application filed in the name of Basil A. Strout.

It is an object of the present invention to provide a heel attaching machine which is inexpensive and is fast and effective in its operation. With the above object in view a jack or holddown of the machne is connected to a fluid pressure operated piston rod slidable in a housing which is normally secured to a main frame of the machine and which, in accordance with a feature of the invention, may be initially moved into different adjusted positions toward and away from a nailing die of the machine to accommodate shoes of different sizes.

The nailing die together with primary and secondary sets of nail drivers, as in the machine disclosed in said Patent No. 2,994,882, is moved during the cycle of the machine between a heel attaching station and a nail loading station to receive a load of nails thereby eliminating in the machine the well known loader block which is commonly used in machines of this type to deliver nails to the nailing die. The present machine however is provided with mechanism which is adapted to couple the sets of drivers to fluid pressure driving means of the machine and which is much simpler and more effective in operation than is corresponding mechanism of the machine disclosed in said patent. Moreover, in the present machine and nailing die and the sets of nail drivers may, as above explained, be moved automatically between the heel attaching station and the heel receiving station or, in accordance with another feature of the invention, may be independently moved by fluid pressure means between these two stations selectively without requiring the machine to travel through its cycle, or may be rendered inactive so that during the heel attaching cycle of the machine the nailing die and the sets of drivers do not move to the heel receiving station to pick up the nails. The above features, as will appear later, are especially useful where for one or more reasons a full complement of nails has not been driven into the work and it is desirable to drive one or more nails into the work by the use of the machine.

The present machine is also provided with an improved magazine for housing rubber heels and an improved loader for automatically delivering heels from the magazine to a heel attaching position just above the nailing die arranged at the heel attaching station, the magazine, in accordance with a further feature of the invention, comprising side sections which are initially adjustable along graded paths toward and away from a fixed rear section of the magazine so that heels of different sizes will fit accurately in the magazine and will drop with accuracy onto a supporting bed from which they are subsequently delivered by a transfer slide to a transfer station where the heels are delivered to a heel ring movable to and away from the heel attaching station. The transfer slide is provided with means comprising a pair of grippers which clamp to the transfer slide the heels which have dropped from the magazine onto the supporting bed, said grippers, in accordance with another feature of the invention, being initially responsive to the adjustment of the forward sections of the magazine with relation to the rear section of the magazine the construction and arrangement being such that irrespective of the size of the heel the grippers will engage the heel at the forward ends respectively of the sides of the heel and in their open positions will be spaced a constant distance from the heel and will immediately contact heels of all sizes as the transfer slide starts to move forwardly.

The present machine consists in the above novel features and in hereinafter described novel features, reference being had to the accompanying drawings, which illustrate one embodiment of the invention, selected for purposes of illustration, said invention being fully disclosed in the following description and claims.

In the drawings,

FIGS. 2 and 3 show in perspective the upper portion of the machine as viewed respectively from the left and right;

FIG. 4 is a section showing in detail fluid pressure operated means for supporting and actuating a jack or holddown of the machine;

FIG. 5 is a plan view of the mechanism shown in FIG. 4;

FIG. 7 shows in front elevation, partly in section and partly broken away, nail driving mechanism of the machine and also portions of mechanism for operating a heel ring supporting carriage of the machine;

FIG. 8 is a section on the line VIII—VIII of FIG. 7;

FIG. 9 is a perspective view of treadle mechanism of the machine;

FIG. 10 is a view corresponding generally to an upper portion of the machine shown in FIG. 8 but showing the nail driving mechanism of the machine in a nail receiving position below a loader block of the nail distributor disclosed in an application for United States Letters Patent Serial No. 278,869, filed May 8, 1963 in the names of Fred T. MacKenzie, et al.;

FIG. 19 is a perspective view showing the forward portion of the heel handler, a heel tamper associated with the handler being shown in an inactive position to which it is moved preparatory to loading heels into a heel magazine of the handler and a heel transfer slide of the handler being in its rear position below the magazine;

FIG. 20 is a view similar to a portion of FIG. 9 but showing the tamper in an active position above a rubber heel which has been moved by the heel transfer slide from its heel receiving position below the magazine to a transfer station above a heel ring of the carriage;

Figure 22:
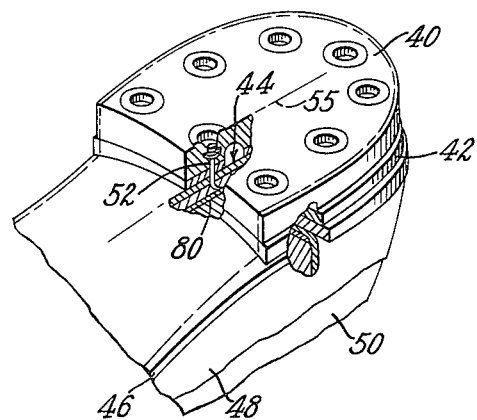
FIG. 22 is a perspective view, partly in section, of the rear end of an inverted shoe to which a base lift and a rubber heel have been attached by use of the illustrative machine.

The illustrative machine is described with reference to the attachment of a rubber heel 40 (FIGS. 15, 16, 20 and 22) and a base lift 42 to the heel seat portion 44 (FIG. 22) of an outsole 46 of a shoe 48, which is mounted on a last 50, by the use of headed nails 52.

Figure 6:
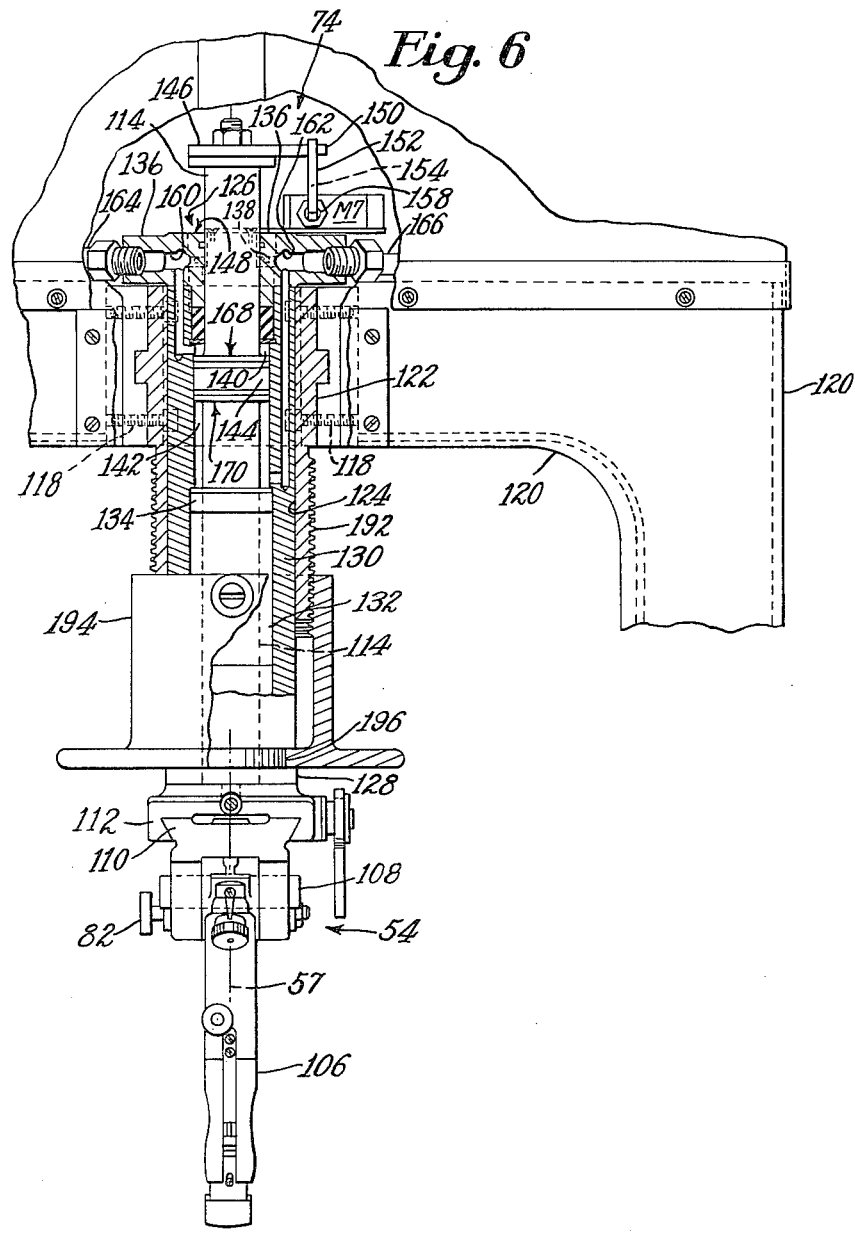
FIG. 6 is a front view of the jack supporting and operating mechanism, partly in section on the line VI—VI of FIG. 5.

The machine comprises a jack, support or holddown 54 for the shoe 48 mounted on the last 50, a nailing die 56 having passages 58, a form or "heel ring" 60 for positioning and holding at a wheel attaching station 62 the rubber heel 40 over the nailing die then in a forward or retracted position beneath the jack, a gage 64 for positioning the base lift 42 on the rubber heel, upper and lower driver heads 66, 68 (FIGS. 7, 8 and 10) to which are secured respectively first and second sets of nail drivers 70, 72, fluid (oil) pressure operated means 74 (FIGS. 4, 5 and 6) for causing the heel seat portion 44 of the outsole 46 of the shoe 48, which is positioned on or is manually held positioned under the jack 54 by the use of a back gage 76, to be lowered against the base lift 42 positioned upon the rubber heel 40 by the base lift gage 64 and fluid (oil) pressure operated means 78 (FIGS. 7 and 8) for selectively raising the first set of drivers or for successively raising the first and second sets of drivers to cause nails in the passages of the nailing die to be driven into the rubber heel and its associated base lift, which together form a composite heel, as well as into the heel seat of the shoe, the pointed ends of the nails being clinched against a heel plate 80 (FIG. 22) of the last.

It will be noted that in the use of the present machine the operator prefers to remove the usual last pin (not shown) at the lower end of the jack 54 and permanently to secure by the use of a screw 82 (FIG. 1), hereinafter referred to, the jack in an upright position, the operator, as above indicated, positioning the shoe just beneath the jack by the use of the back gage 76.

The jack 54 and the back gage 76 are substantially the same as the jack and the back gage disclosed in the above-mentioned United States Letters Patent No. 2,994,882. Jacks of the type herein illustrated are well known as disclosed in United States Letters Patent No. 1,157,688, granted Oct. 26, 1915 on an application filed in the name of Lester L. Glidden and back gages of the general type illustrated herein are also well known as disclosed in United States Letters Patent No. 1,723,310, granted Aug. 6, 1929 on an application filed in the name of John F. Standish.

Figure 25:
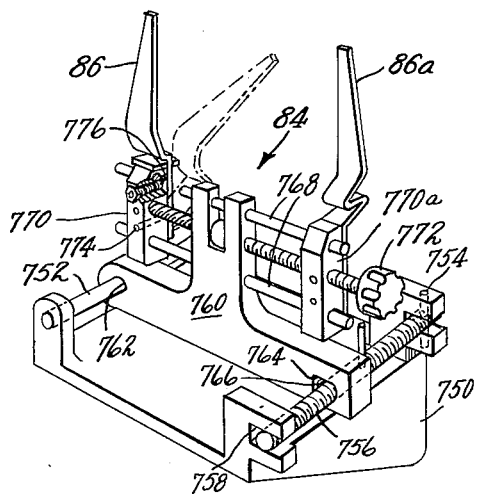
FIG. 25 shows in perspective a forepart gage of the machine.
Figure 24:
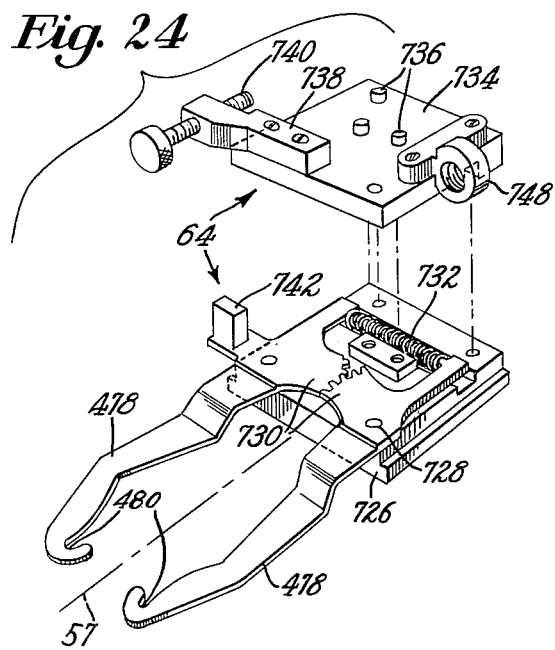

To assist the operator in the positioning of a heightwise median plane 55 (FIG. 22) of the heel seat portion 44 of the shoe 48 in a vertical median reference plane 57 of the nailing die 56 and the jack 54 at the heel attaching station 62, there is provided a forepart gage 84 (FIGS. 1 and 25) provided with upstanding arms 86, 86a which are adapted to be engaged by the edges of outsoles 46 of the right and left shoes 48 respectively at the break lines of said outsoles. When the rubber heel 40 and its associated base lift 42 have been attached to the shoe, the jack 54 is raised and the first and second sets of nail drivers 70, 72 are lowered to their retracted or idle positions by the fluid pressure operated means 78, the shoe then being removed manually from the machine. While the shoe 48 is being removed from the machine the nailing die 56, which is secured to a multi-part slide 88, is moved rearward together with said slide by the above-mentioned fluid pressure operated means 74, hereinafter described, to a nail receiving position beneath a tube holder or nail loader 90 preparatory to receiving nails 52 from a nail distributor 92, the nailing die, after receiving said nails, being returned by said fluid pressure operated means to the heel attaching station 62 and below the jack 54.

Figure 14:
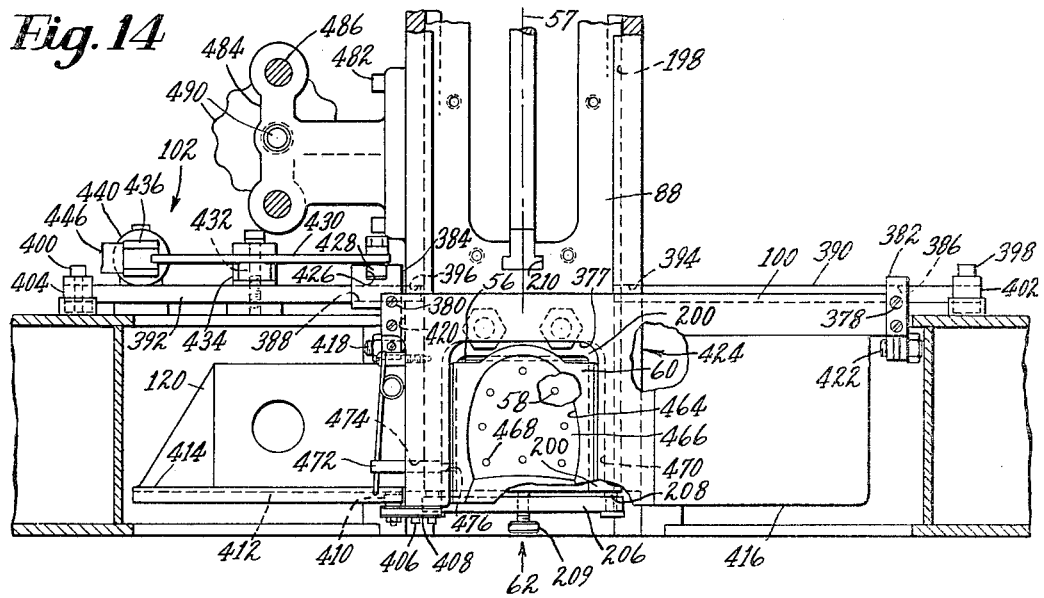
FIG. 14 is a plan view, partly broken away and partly in section, on the line XIV—XIV of FIG. 10.

As will be hereinafter explained, the rubber heels 40 are manually "loaded" initially in stacked relation into a magazine 94 and are automatically moved one at a time to a transfer station 96 by an air pressure operated heel handler 98. After the completion of a heel attaching cycle of the machine the heel ring 60, which is interchangeably secured to a carriage 100 movable in a rectilinear path extending transversely of the machine, is moved by air pressure operated means 102 (FIGS. 7, 11 and 14) to the transfer station 96, said heel ring then resting in a heel receiving position below the heel handler 98 which at that time is in its forward waiting position above the heel ring and below a tamper or presser member 104 mounted above the heel, said tamper, in response to movement of the heel ring to its heel receiving position at the transfer station, being adapted through electrically controlled air pressure operated means hereinafter described to force the heel in the handler into the heel ring. When the rubber heel 40 has been transferred to the heel ring 60 waiting at the transfer station 96, electrically controlled air pressure operated means is rendered active to cause the tamper 104 to move to its raised or retracted position as well as to cause the heel handler 98 to return to its retracted position below the magazine 94 and to cause the heel to return to the heel attaching station 62 above the nailing die 56 and below the jack 54.

The jack 54 comprises a post 106 journaled on a bearing pin 108 mounted on a carrier slide 110 which may be initially set forward and rearward in a dovetail guideway of a header 112 secured to the lower end of a piston rod 114. The lower end of the pack post 106 may have a last pin (not shown) extending downwardly from it and the last which bears the shoe may be mounted on this pin after the post has been swung forward to a loading and unloading position, the post and the work then being swung rearwardly preparatory to positioning the work in the machine. As above stated, in the use of the present machine most operators prefer to lock the jack post 106 in its upright position, this being accomplished by the use of the hand screw 82 which is threaded into one of the ears of the carrier slide 110 and bears against the post, The back gage 76, which may be referred to as a "crease finder," may be raised together with a mount therefor when the jack post 106 is swung forwardly, said mount being initially adjustable heightwise, widthwise and forwardly and rearwardly of the machine by mechanism which is well known in the art.

Secured by screws 118 (FIGS. 4, 5 and 6) to a main frame 120 of the machine is a guide sleeve or housing 122 having a cylindrical bore 124 in which is mounted for initial vertical adjustment a multipart cylinder 126 comprising a foot piece 128 secured by screws to a cylindrical housing 130 of the cylinder, metal and fiber packings 132, 134 respectively and a head 136 secured by screws 138 to the upper end of the cylindrical housing. Slidable in a bore of the mulitpart cylinder 126 and forming upper and lower chambers 140, 142 therewith is a piston 144 which is formed integral with the piston rod 114 and is operatively connected as above described to the jack post 106.

Secured to the upper end of the piston rod 114 is a stop plate 146 which engages a stop face 148 of the multipart cylinder 126 to limit downward movement of the piston rod when the machine is operated through its cycle and there is no work in the machine. Secured by screws 150 to the stop plate 146 is a cam 152 having upper and lower side faces 154, 156 respectively adapted to be engaged by a plunger 158 of a clamp actuated microswitch M7 which is normally closed by spring action and is secured to the multipart cylinder 126. When the piston 144 is in its raised idle position determined by the engagement of a flange of the foot piece 128 with a drum 194 hereinafter referred to, the plunger 158 of the switch M7 is in a projected position in engagement with the lower side face 156 of the cam 152 and accordingly the switch is closed by spring action but when the piston is depressed to clamp the heel seat portion 44 of the outsole 46 of the shoe 48 against the base lift 42 and the base lift against the rubber heel 40, the plunger engages the upper side face 154 of the cam to cause the switch M7 to open as will be hereinafter explained.

The multipart cylinder 126 is provided with oil passages 160, 162 which are connected to oil lines 164, 166 respectively and to the upper and lower chambers 140, 142 respectively. As will be explained later, when oil under low and exhaust pressures respectively is allowed to engage faces 168, 170 respectively of the piston 144 in response to the depressing of a treadle 172 (FIGS. 1 and 9) to a recognizable position hereinafter referred to, the piston and accordingly the jack 54 are lowered to cause the heel seat portion of the outsole 46 of the shoe 48 positioned below the jack to be forced against the base lift 42 and the base lift to be forced against the rubber heel 40 in the heel ring 60, the jack at this time being operated under low pressure of approximately 200 lbs. per square inch and the operator ascertaining that the work is correctly positioned in the machine. After ascertaining that the work is correctly positioned in the machine the operator further depresses the treadle 172 causing the jack 54 to be lowered under heavy oil pressure which increases as the pressure of the sets of nail drivers 70, 72 against the nails being driven increases. As will appear later, the effective area of the face 168 of the holddown piston 144 is greater than the areas respectively of faces of pistons which will be hereinafter referred to and which cause the first and the second sets of nail drivers 70, 72 to operate.

The treadle 172 is fulcrumed at its rear end on a bearing rod 174 carried by the main frame 120 and has pivotally connected to it an upstanding rod 176 which passes freely through a bore in the main frame, outer and inner springs 178, 179 being mounted on the rod and being interposed between the main frame and a washer backed up by a nut 180 threaded onto the upper end of the rod. It will be noted that when the treadle 172 is in its lowered position the upper end of the inner spring 179 is arranged a substantial distance below the upper end of the outer spring 178. Upward movement of the treadle 172 is limited by the engagement of the treadle with a stop post 182 secured to the main frame 120. Mounted on the treadle 172 are strikers 184, 186 which, when the treadle is in its raised position shown in FIG. 9, engage plungers 188, 190 respectively of normally closed microswitches M2 and M3 and opens said microswitches against spring action.

After using the machine for a short period the operator "recognizes" or "feels" the amount of force necessary to depress the treadle 172 by an amount which will cause the striker 184 to release the plunger 188 of the microswitch M2 sufficiently to permit this switch to close by spring action. At this time the operator is starting to depress the treadle against the action of both springs 178 and 179 but the striker 186 still depresses the plunger 190 of the microswitch M3 sufficiently to hold this microswitch open. Upon depression of the treadle 172 beyond said recognizable setting the plunger 186 of the microswitch M3 is released and the switch is permitted to close by spring action. As will appear later, the closing of the microswitch M2 results in the jack 54 being depressed against the work with initial holddown pressure and at this time the release of the treadle 172 will result in the jack being raised to its idle position. The closing of the microswitch M3 however results in the jack 54 being forced against the work with heavy holddown pressure and the first and second sets of nail drivers 70, 72 (if the machine is initially adjusted for double driving) being rendered effective to drive in succession the first and second sets of nails into the work, the holddown force being proportionately greater than and dependent upon the force required to drive the nails into the work. It will be noted that in breaking in a new operator on the machine it is customary to treadle the machine in two stages as above described. However, an experienced operator usually fully depresses the treadle 172 in one continuous operation.

In order to position the shoe 48 mounted on the last 50 in the machine, it is necessary that there shall be a slight heightwise clearance between the upper face of the back cone of the last and the bottom of the jack post 106, the desired amount of clearance varying in accordance with the preferences of the different operators. Accordingly, it is desirable for the operator initially to position the multipart cylinder 126 in different vertical operating positions in accordance with the height of the last 50 bearing the shoe 48. With the above considerations in view the guide sleeve 122 has an outer threaded portion 192 meshing with an internally threaded drum 194 having a flange portion rotatably mounted in a circular groove 196 formed in the multipart cylinder, the arrangement being such that upon rotation of the drum, the cylinder together with the piston 144 and the piston rod 114 are initially raised or lowered, the chambers 142 and 140 at this time being open to oil under low and exhaust pressures respectively as will be hereinafter explained.

The multipart slide 88, which carries the nailing die 56, is reciprocable in guideways 198 (FIGS. 7, 8, 10, 11 and 14) formed in the main frame 120 of the machine and comprises a block 200 which is secured by screws 202 to and forms in effect part of the slide. The nailing die 56 fits in a cavity 204 formed at the forward end of the slide 88, nailing dies having driver passages 58 of different patterns being readily inserted interchangeably in and removed from the cavity. The nailing die 56 is held in the cavity 204 of the slide 88 by a bar 206 having hooked end portions which are attached to headed retaining studs 208 secured to the forward end of the slide, a screw 209 threaded into the bar 206 and pressing against the nailing die serving to retain the bar in place.

Figure 11:
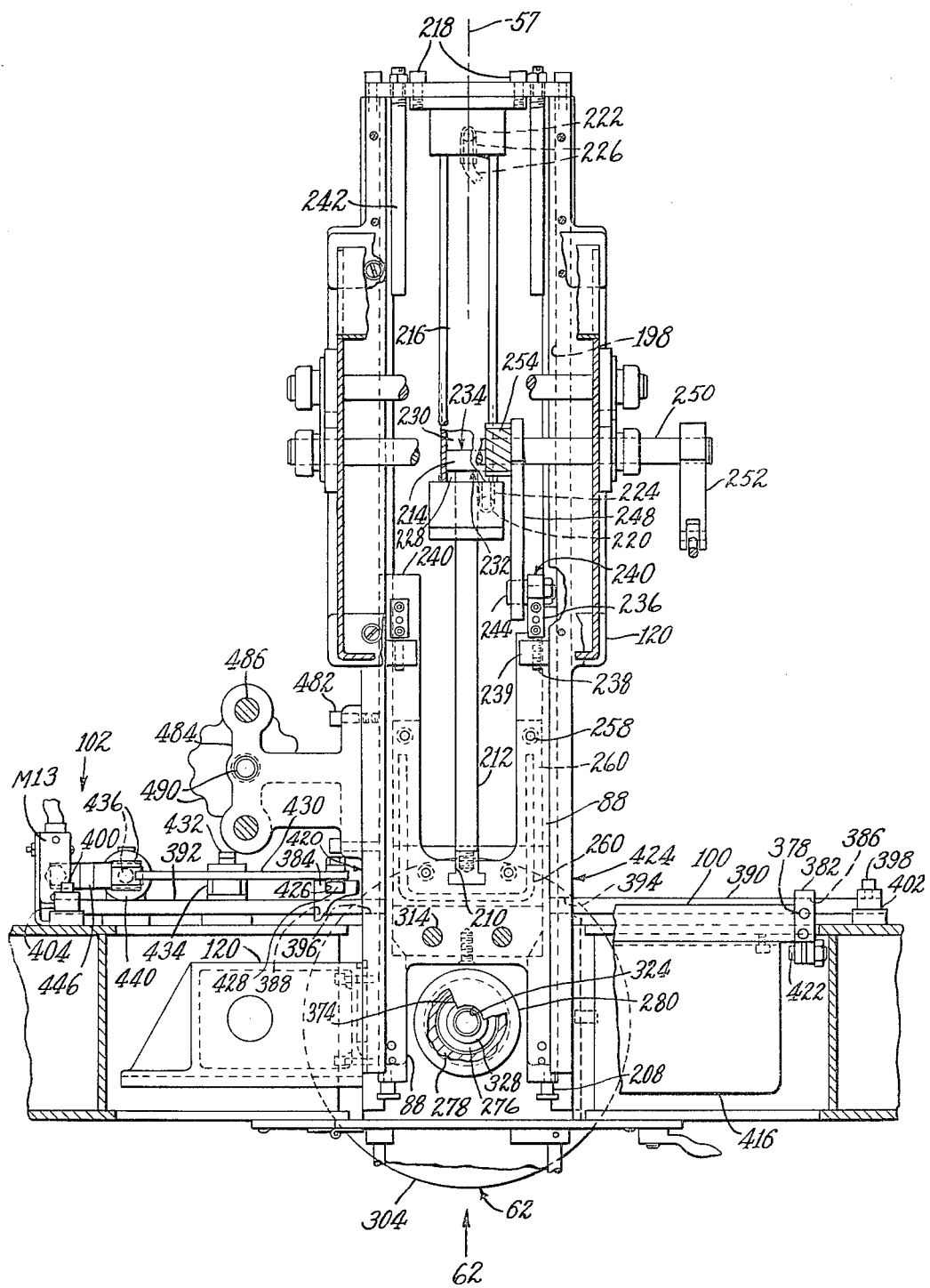
FIG. 11 is a view, partly broken away, on the line XI—XI of FIG. 10.
Figure 12:
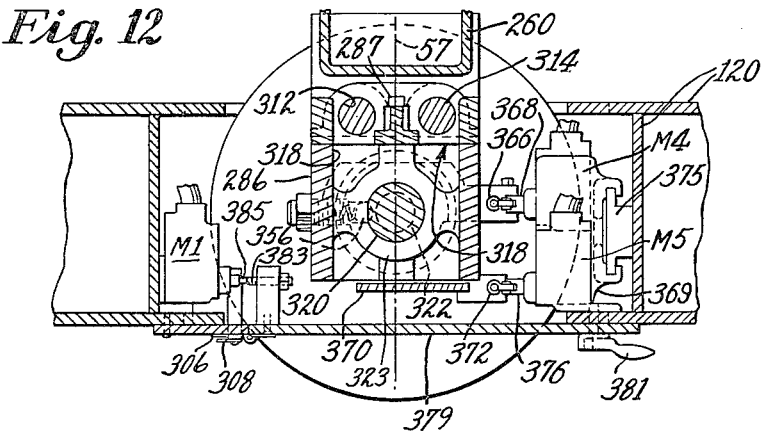
FIG. 12 is a section on the line XII—XII of FIG. 7.
Figure 13:
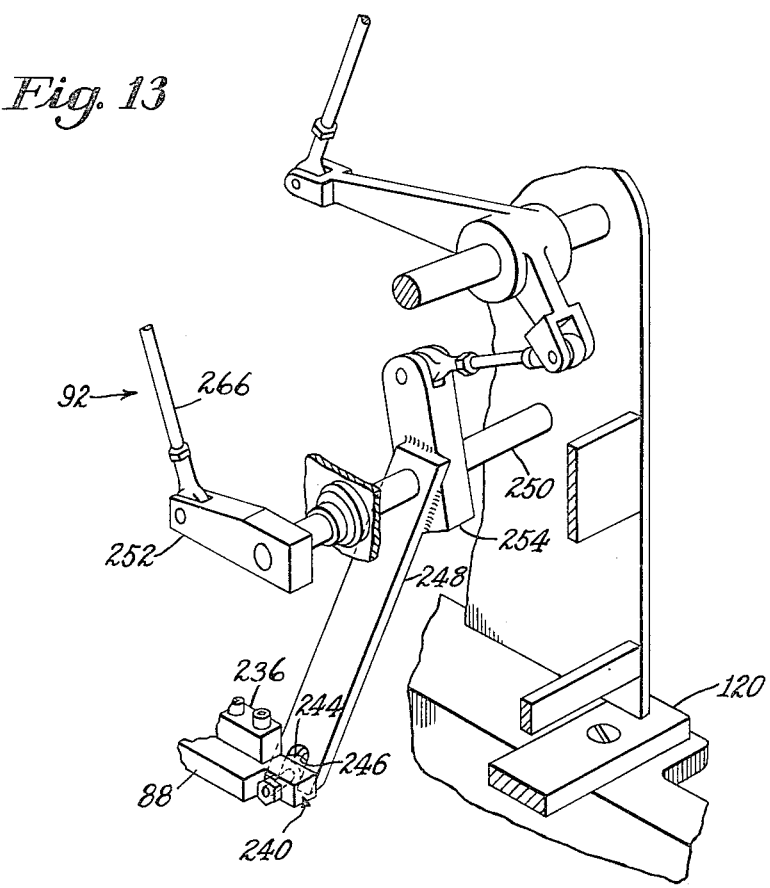
FIG. 13 is a perspective view showing mechanism for operatively connecting a nailing die slide of the illustrative machine to operating mechanism of the nail distributor disclosed in said application Serial No. 278,869.

The rear portion of the slide 88 is bifurcated as viewed in plan (FIGS. 11 and 14) and is provided with a T-shaped notch 210 in which fits, with a slight amount of play, a connecting rod 212 secured to a piston 214 reciprocable in a cylinder 216 fixedly attached to the main frame 120 by screws 218 (FIGS. 10 and 11). The cylinder 216 has a pair of ports 220, 222 connecting oil lines 224, 226, hereinafter referred to, to chambers 228, 230 formed by the cylinder and faces 232, 234, respectively, of the piston 214. Forward movement of the piston 214 in the cylinder 216 and accordingly of the slide 88 in the guideways 198 is limited by the engagement of an abutment piece 236 secured to the slide with a stop screw 238 threaded into a lug 239 secured to the main frame 120. Rearward movement of the slide 88 along the guideways 198 is limited by the engagement of the end faces 240 of the bifurcated portion of the slide with a pair of rods 242 which are adjustably secured to the main frame 120.

Secured to the bifurcated rear end portion of the slide 88 is a roll 244 which fits in a notch 246 at the lower end of an arm 248 brazed to a shaft 250 journaled on an upstanding portion of the main frame 120. Also secured to the shaft 250 is an arm 252 which through mechanism disclosed in the above-mentioned application Serial No. 278,869 operates an inverting bar 253 (FIG. 2) and a transfer slide (not shown) of the distributor 92. The shaft 250 has also secured to it a third arm 254 which, as disclosed in said application Serial No. 278,869 operates a tilt pot hopper 256 (FIGS. 1, 2 and 3) of the nail distributor 92. As will be explained later, during the cycle of the machine low pressure oil and exhaust oil are open respectively to the chambers 228, 230 and accordingly to the faces 232, 234 of the piston 214 with the result that the slide 88 is moved from its forward position, in which the nailing die 56 is arranged at the heel attaching station 62, to its rearward position in engagement with the stop rods 242, the nailing die at this time being arranged below the tube holder or nail loader 90. After a predetermined dwell which may be varied, below the nail loader 90, low pressure oil and exhaust oil are rendered open to the chambers 230, 228, respectively, and to the faces 234, 232 of the piston 214 with the result that the slide 88 is moved forwardly until it engages the stop screw 238, the nailing die 56 at this time being positioned at the heel attaching station 62.

The die carrying slide 88 has secured to it by screws 258 a depending bracket 260 upon which is adjustably mounted a striker screw 262 (FIGS. 8 and 10), said screw, when the slide is in its forward position, having depressed against spring action a plunger 264 of a normally closed microswitch M6, which is fixed to the main frame 120, thus holding this microswitch open. When, as above explained, the nailing die slide 88 is moved rearward, the stricker screw 262 moves away from the plunger 264 of the microswitch M6 thus allowing this microswitch to close by spring action. As will be hereinafter explained, when the nailing die 56 through the provision of electrically controlled, oil pressure operated means has moved to its nail receiving position below the tube holder or nail loader 90 and has dwelled there for a period of sufficient duration to receive nails from said loader, the slide 88 and accordingly the nailing die are returned to their forward positions.

It will be explained at this point that when the slide 88 is moved rearwardly it moves the arm 252 counter-clockwise as viewed in FIG. 3 causing a rack 266 to be depressed and nails resting in the inverting bar 253 of the nail distributor 92 to drop heads down through distributor delivery tubes 268 and tubes 269 of the tube holder or nail loader 90 into the passages 58 of the nailing die 56, the heads of said nails resting upon the drivers 70, 72 which as will now be explained, move with the nailing die.

The fluid pressure operated means 78 (FIGS. 7 and 8) which is adapted to drive nails into the work and comprises the first and second sets of nail drivers 70, 72 slidable in associated sets of passages 58 of the nailing die 56 will now be described. Secured by screws 270 to the main frame 120 is a cylindrical casing 272 having formed in it a bore 274 and slidable in this bore is an outer piston or plunger 276. Threaded onto the upper end portion of the piston 276 and forming part of the piston is a sleeve 278 having at its upper and lower ends laterally projecting circular lips 280, 282, the lower lip serving to limit downward movement of the piston by engagement with the upper end of the cylindrical casing 272, and the upper lip being constructed and arranged to be operatively enveloped in fitting relation by a semi-circular grooved portion 284 formed in the lower end of a two-part coupling beam 286 held together by screws 287.

The outer piston 276 has a lower head provided with a forward extension 288 slidingly mounted in a vertical slot 290 formed in a guide plate 292 which is secured by screws 294 to the main frame 120 and serves to prevent rotation of the piston 276 in the cylindrical casing 272. Threaded into and accordingly adjustably secured to the forward extension 288 of the piston 276 is a striker screw 296 adapted, just before the piston reaches its lower limit of movement in the cylindrical casing 272, to engage a plunger 298 of a normally open driver return microswitch M8 and accordingly to close this microswitch as will be explained later. Upward movement of the sleeve 278 and accordingly the piston 276 is limited by the engagement of the lower lip 282 of the sleeve with a stop face 300 of a drum 302 which is threaded onto the cylindrical casing 272 and may be initially moved into different heightwise operating positions by rotating the drum manually by gripping a projecting flange 304 thereof. In order to expedite the vertical adjustment of the drum 302 to control the upward extent to which it is desired to raise the drivers 70, 72, there is provided a graduated scale 306 (FIGS. 1, 7, 10 and 12) along which registers a pointer 308 secured to a rod 310 which is slidingly mounted in a vertical bore of a guide block 311 secured to the main frame 120 and which is biased against the upper face of the projecting flange 304 of the drum by a spring 313.

Extending heightwise through the rear end of the coupling beam 286 are a pair of parallel bores 312 in which register a pair of cylindrical guide rods 314 the upper ends of which are secured to the slide 88 and the lower ends of which are secured to the depending bracket 260 which as above explained is fixed to said slide. From the foregoing it will be apparent that when the piston 276 is raised or lowered by oil pressure operated means hereinafter described, the coupling beam 286, when the slide 88 is in its forward position shown in FIG. 8, will partake of such movement of the piston, said coupling beam sliding vertically along the guide rods 314.

The coupling beam 286 has formed in it spaced opposite channels 316 for receiving the upper driver head 66 which has secured to it the first set of drivers 70. Formed in the coupling beam 286 is a cavity 318 which is of rectangular cross section and is open at the front and in which slides an upper flanged end of a connector member 320 provided with a depending shank portion which has formed in it a circular notch 322 and fits slidingly in a bore of a spider reinforcement 323 of the beam, said shank portion when the machine is idle overlying a bore 324 at the upper end of the sleeve 278 which in effect forms part of the outer piston or plunger 276.

Slidable in a bore 326 of the outer piston or plunger 276 is an inner piston 328 having a threaded shank to which a packing is secured by a nut 330, said shank comprising a depending bumper portion 332. The inner piston 328 has a bottom or lower end 333 comprising a plurality of faces collectively constituting effective areas against which oil under pressure is forced as will appear later. It will be noted that the inner piston has at its upper end a chamfered neck portion which is normally housed with some clearance in the bore 324 of the sleeve 278.

Formed between the cylindrical casing 272, the outer piston 276 and a sealing piece 334, which is locked between the casing and the piston is a chamber 336 open to a port 338 formed in the casing, said piston having a circular face or shoulder 340 against which oil operates. The piston or plunger 276 has formed in its lower end a port 342 which is connected by a passage 344 and a port 345 in the piston to a chamber 346 formed by the piston, the cylindrical casing 272 and a sealing member 348 secured to the casing. The lower end of the chamber 346 is defined by a circular face 350 against which the oil operates and the ports 338, 342 are connected to lines 352, 354 respectively.

When the nailing die slide 88 is in its forward position at the heel attaching station 62 (FIG. 8) the upper lip 280 of the sleeve 278 secured to the outer piston or plunger 276 engages in the semi-circular grooved portion 284 of the coupling beam 286 and when oil under heavy pressure is available for the face 340 of the piston, the face 350 of the piston being open to oil under exhaust pressure, the piston together with the coupling beam will be raised causing the upper driver head 66 to be raised and the first set of nail drivers 70 to drive nails then in associated passages 58 of the nailing die 56 into the rubber heel 40 and the base lift 42 and into the heel seat portion 44 of the outsole 46 of the shoe 48, said nails being clinched against the heel plate 80 of the last 50 upon which the shoe is mounted. As the coupling beam 286 is raised the connector member 320 is raised with said beam by reason of the fact that a spring-biased ball 356 movable in a recess of the beam registers in the notch 322 formed in the connector member. The upper ends of the first and second sets of drivers 70, 72 respectively are commonly arranged in the same general plane when the machine is idle and when these drivers engage the work the secondary drivers cease their upward movement, the connecting member 320 being held stationary as the coupling beam continues its upward movement to cause the first set of drivers to drive associated nails into the work. During upward movement of the outer piston 276 the inner piston 328 moves upwardly to an extent permitted by the connector member.

The outer piston or plunger 276 also has at its lower end a port 358 which is connected to a line 360 and which, through a passage 362, is open to a chamber 364 formed by the bore 326. The cross-sectional area of the chamber 364 is somewhat smaller than the area of the shoulder 340.

The coupling beam 286 has secured to it a striker 366 which, just before the lip 282 of the sleeve 278 engages the stop face 300 of the drum 302, engages a plunger 368 of a normally open first drive microswitch M4 mounted on a slide 369 causing this switch to be closed. When upward movement of the first set of drivers 70 ceases high pressure oil is admitted through the port 358 in the lower head of the piston 276 to the chamber 364 as the result of a closing of the microswitch M4, as will appear later, thus raising under heavy pressure the inner piston 328 which is in engagement with the connector member 320 to cause the second set of drivers 72 to drive nails in associated passages 58 of the nailing die 56 into the work.

The connector member 320 has screwed to it a depending plate 370 to which is adjustably secured a striker 372 which, just before upward movement of the second set of drivers 72 ceases, by reason of the engagement of the piston 328 with a shoulder 374 of the sleeve 278, engages a plunger 376 of a normally open second drive microswitch M5 mounted on the slide 369 causing this microswitch to close and through means hereinafter disclosed, causing low pressure oil and oil under exhaust pressure to be available for the faces 350, 340 respectively of the outer piston 276 with the result that this piston is depressed causing, through the above described mechanism, the first and second sets of drivers 70, 72 to be moved to their lowered retracted or starting positions initially established by the engagement of the sleeve portion 278 of the piston with the upper face of the cylindrical casing 272. The inner piston 328 is moved to its lowered starting position by the engagement of the shoulder 374 of the sleeve portion 278 of the outer piston 276 with the upper end portion of the inner piston 328 low pressure exerted against the lower face of the inner piston insuring that the inner piston is held against said shoulder. The connector member 320 is returned to its lowered starting position by the downward movement of the coupling beam 286 against the upper end of said member, the spring-pressed ball 356 carried by the coupling beam at this time being in register with the circular notch 322 in the depending stem of the connector member. As the drivers 70, 72 are lowered the strikers 366, 372 move away from the plungers 368, 376 of the first and second drive microswitches M4, M5 allowing these microswitches to open by spring action.

The slide 369 is movable heightwise along a guide 375 (FIGS. 7 and 12) secured to the frame of the machine and has formed at its lower end portion a notch 377 in which fits the projecting flange 304 of the drum 302. It will thus be clear that when the drum is moved into different heightwise operating positions it carries with it the microswitches M4 and M5 into correlated heightwise positions.

Figure 1:
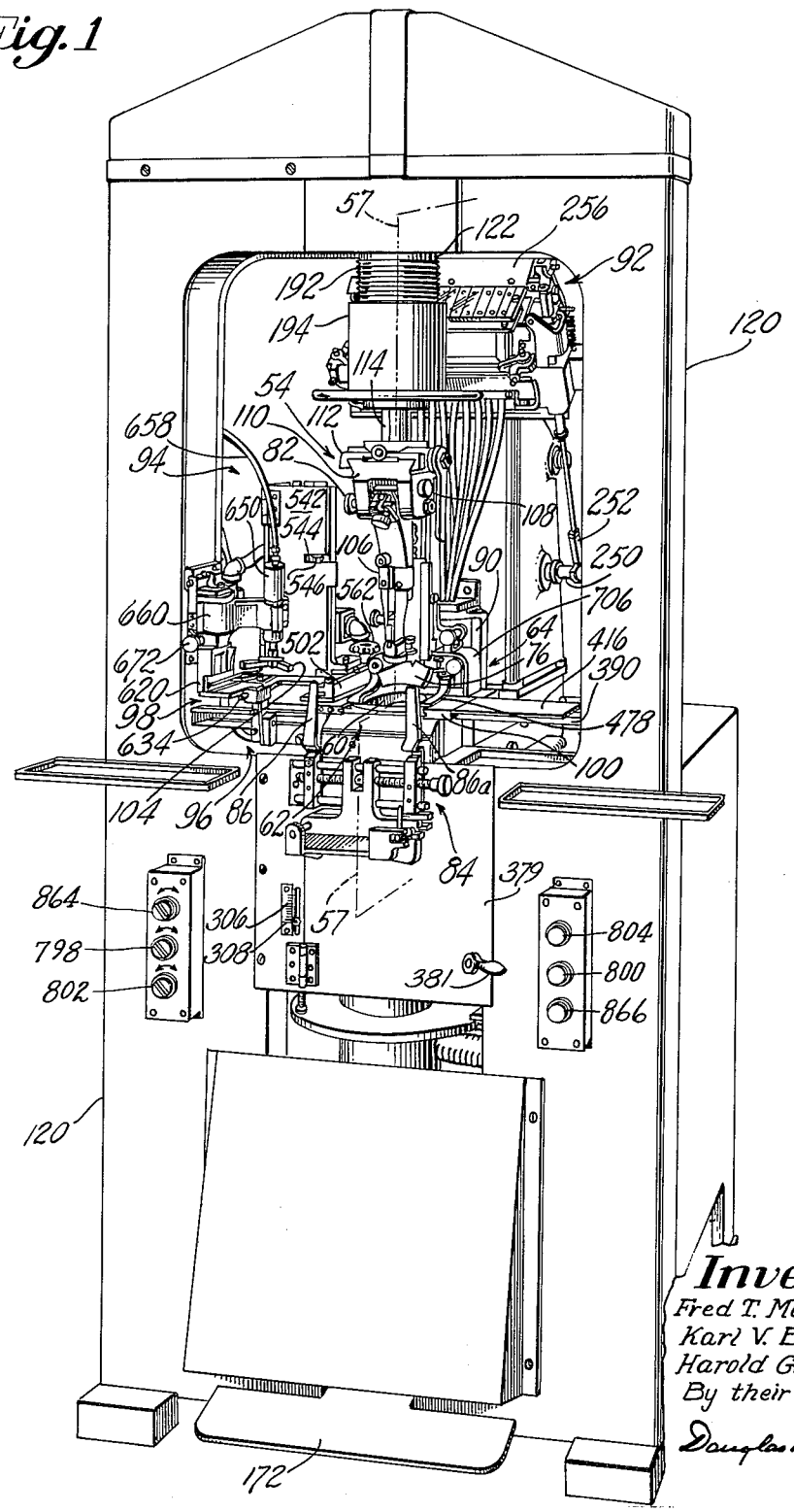
FIG. 1 is a perspective view showing the front of the illustrative machine.

In order to render the above described nail driving mechanism accessible, the main frame 120 has hinged on it a door 379 (FIGS. 1, 10 and 12) secured in its closed position shown in FIG. 1 by a latch 381. In order to insure that the machine cannot be operated through any part of its cycle when the door 379 is open, said door has secured to it a striker 383 adapted to depress, when the door is closed, a plunger 385 of a normally open microswitch M1 secured to the main frame 120 whereby to cause the switch to be closed. When the door is open the striker 383 is not in contact with the plunger 385 which is moved by spring action to a position in which the microswitch is opened, as will be hereinafter described.

As above explained, the automatic heel loader comprises the magazine 94 into which heels of any one size are initially stacked manually, the handler 98 for delivering the heels from the magazine to a waiting position at the transfer station 96, the carriage 100 which has a U-shaped opening 377 (FIGS. 8, 14 and 15) for receiving the heel ring or form 60 and is mounted for movement transversely of the machine to move the heel ring or form 60 between its heel attaching position above the nailing die 56 at the heel attaching station 62 and a heel receiving position at the transfer station 96, and the tamper or presser member 104 which is adapted to depress the heel in the handler from its waiting position at the transfer station into the heel ring moved to and waiting at said transfer station. As will be hereinafter explained, the handler 98, the heel ring 60 and the tamper 104 are automatically operated in timed relation through their cycle by air pressure actuated means which is operated in timed relation with the heel attaching cycle of the machine or which may be initiated through its cycle by manually actuated means hereinafter described.

Secured by screws 378 (FIGS. 7, 11, 14 and 15), 380 (FIG. 14) to the heel ring supporting carriage 100 are brackets 382, 384 provided respectively with alined bores 386, 388 for receiving guide rods 390, 392 the inner portions of which fit in holes 394, 396 in the main frame 120 and the outer end portions of which are secured by screws 398, 400 in bores of mounts 402, 404, fixed to said frame.

Secured by screws 406 to the front of the carriage 100 is a plate 408 (FIGS. 7, 10, 14, 15 and 19) having mounted on it a roll 410 adapted to engage in a groove 412 of a cam 414 secured to a table portion of the main frame 120. When the heel ring 60 is positioned over the nailing die 56 it is desirable that the ring shell rest on the die and when the ring is at the transfer station 96 it is desirable that the ring shall be supported by the above-mentioned table portion of the main frame 120. When the carriage 100 is being moved between its heel attaching position and its heel receiving position it is desirable that the bottom of the carriage shall be held away from underlying parts of the machine. Accordingly, the cam groove 412 has a central elevated portion and lower end portions as best shown in FIG. 19.

The carriage 100 also comprises a thin cover plate portion 416 which overlies the nailing die 56 when the heel ring 60 on the carriage is in its heel receiving position at the transfer station 96. In order to limit movement of the carriage 100 to the right as viewed from the front of the machine, and to position the heel ring 60 accurately over the nailing die 56, the bracket 384 has threaded through it a stop screw 418 (FIG. 14) adapted to engage a face 420 of the main frame. Movement of the carriage to the left, as viewed from the front of the machine, to its heel receiving position at the transfer station 96 is limited by the engagement of a screw 422 (FIGS. 7, 11, 14 and 15) threaded through the bracket 382 with a face 424 of the main frame 120.

The bracket 384, which is secured to the carriage 100, has formed in its rear end a vertical cam slot 426 adapted to receive a roll 428 carried by an arm of a bell crank lever 430 journaled on a bearing pin 432 fixed to a mount 434 secured to the main frame 120. Pivotally connected to the other arm of the bell crank lever 430 is a multipart rod 436 secured to a piston 438 (FIG. 7) slidable in a cylinder 440 journaled at its lower end on a bearing pin 442 fixed to a bracket 444 secured to the main frame 120. Attached to the piston rod 436 is a striker 446 which, when the heel ring 60 on the carriage 100 is in its heel attaching and heel receiving positions respectively, has slightly depressed the plungers 448, 450 of normally open microswitches M13, M12 respectively which are secured to the main frame.

Chambers 452, 454 which are formed by the cylinder 440 and faces 456, 458 respectively of the piston 438 are connected to lines 460, 462 which are open alternately to air under substantial and exhaust pressures controlled by electric means, hereinafter described, for the purpose of moving, through the above disclosed mechanism, the heel ring 60 between the heel attaching station 62 and the transfer station 96.

The heel ring 60 is similar to the conventional heel rings used in "outside" heel attaching machines and comprises a heel receiving recess 464 (FIGS. 14, 15, 19 and 20) and a thin bottom plate 466 provided with passages 468 of a pattern corresponding to that of the passages 58 of the nailing die 56 in use. The lateral margins of the U-shaped opening 377 of the carriage 100 have formed in them ways 470 constructed and arranged for the reception of lateral margins of the heel ring 60, said heel ring being held in place in the ways by a spring-pressed retaining pin 472 which fits slidingly in alined bores 474, 476 of the carriage and the heel ring.

Mounted on the main frame 120 of the machine is the base lift gage 64 comprising a pair of arms 478 which are similar to arms 60 of the base lift gage 33 disclosed in the above-mentioned Patent No. 3,071,775. The arms 478 of base lift gage 64 are initially adjustable as a unit forwardly and rearwardly and heightwise of the machine and are also initially moved toward and away from each other, corners 480 of said arms being adapted to be engaged by the forward breast corners of the base lift 42 which just before depressing the treadle 172 of the machine is placed manually on the top of the rubber heel 40 in the heel ring 60, the arms being so arranged that the heel ring will slide under them. The base lift gage 64 will hereinafter be described in detail.

The magazine 94 and the handler 98 for automatically delivering the rubber heels 40 to the heel ring 60 waiting at the transfer station 96 will now be described.

Figure 17:
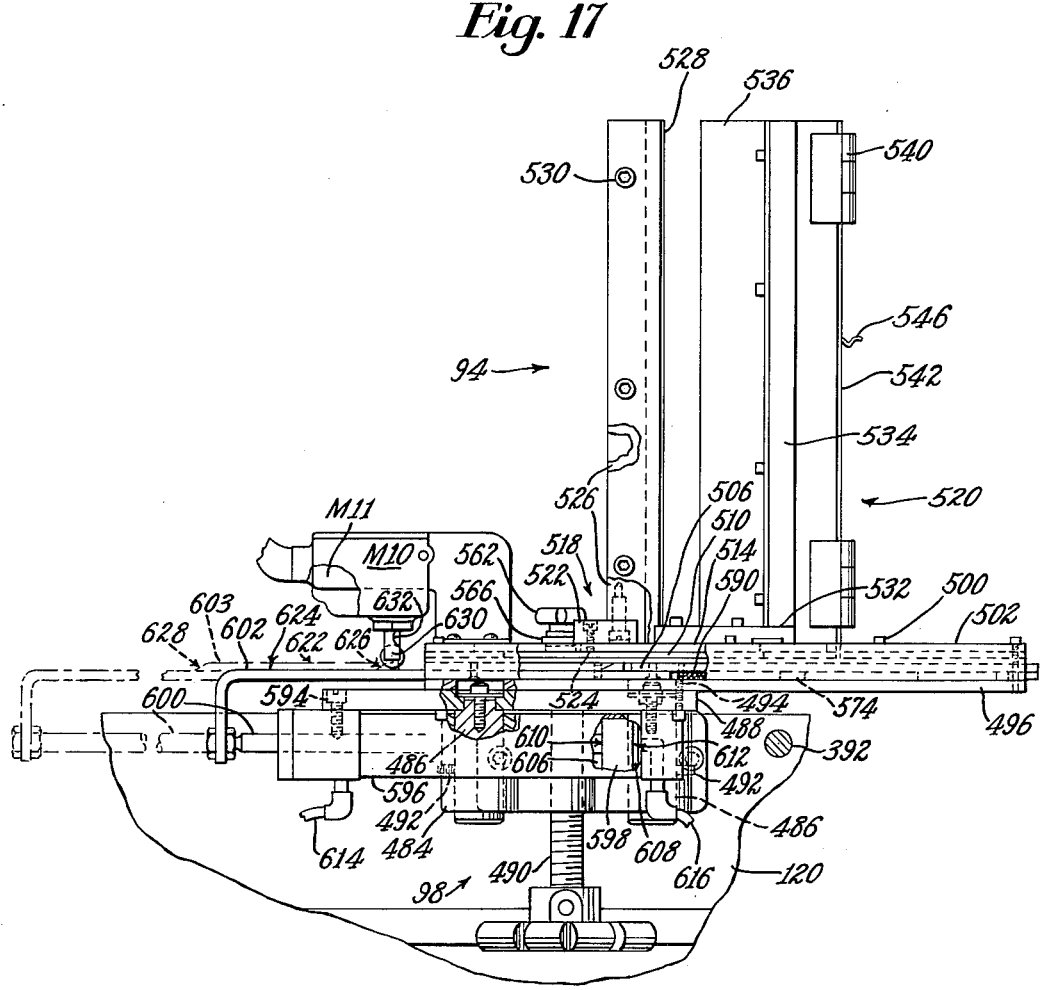
FIG. 17 is a view of the heel handler on the line XVII—XVII of FIG. 16.
Figure 18:
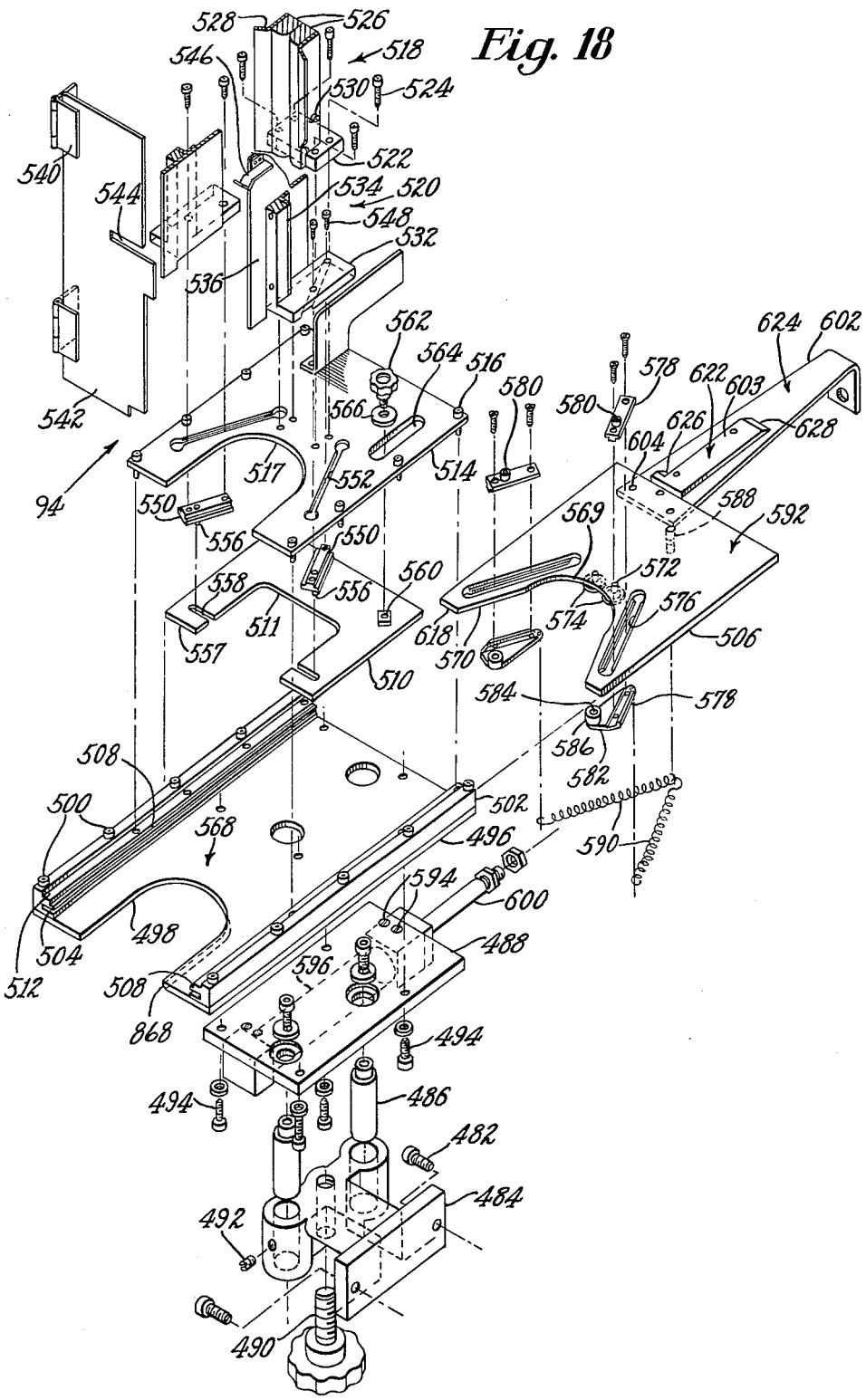
FIG 18 is an exploded view showing details of the heel handler shown in FIG. 16.

The main frame 120 has secured to it by screws 482 (FIGS. 11, 14, 16 and 18) a bracket 484 which, in effect, constitutes part of said frame and has formed in it a pair of parallel bores adapted fittingly to receive depending post portions 486 secured to a horizontal supporting plate 488 which is initially adjusted to the desired elevation, for purposes which will appear later, by a manually operated rod 490 threaded into the bracket. The positioned supporting plate 488 is held against movement upon the bracket 484 by setscrews 492 (FIGS. 16, 17 and 18) which are threaded into the bracket and are forced against the depending post portions 486 of the plate. Rigidly secured by screws 494 to the supporting plate 488 is a supporting bed 496 at the forward end of which is formed a U-shaped opening 498 and which has secured by screws 500 to its opposite sides, guide bars 502 which are provided with guideways 504 along which a heel transfer slide 506 is moved forwardly and rearwardly during the cycle of operation of the handler. The guide bars 502 may be considered as part of the supporting bed 496. The guide bars 502 also have formed in them lower rabbets 508 along which is initially movable a magazine adjusting plate 510 having a U-shaped opening 511, and upper rabbets 512 in which fits a combined spacer and magazine supporting or top plate 514 rigidly secured to the guide bars by screws 516 and having a U-shaped opening 517 over which the magazine 94 is positioned as will be explained.

The magazine 94 comprises a composite rear section or assembly 518 (FIGS. 15, 16, 17 and 18) and left and right composite side sections or assemblies 520. The rear section 518 of the magazine 94 comprises a base member 522 which is secured to the top plate 514 by screws 524, a pair of upstanding bars 526 which are rigidly secured together and to the base plate, and arcuate rear housing portions 528 which are secured by screws 530 to the upstanding bars. The right and left side sections 520 of the magazine 94 each comprises a base member 532, an upstanding bar 534 which is brazed to the base member and a planar side housing portion 536 brazed to the associated upstanding bar. The arcuate rear housing portions 528 of the rear section 518 and the planar side housing portions 536 of the side sections 520 form, in effect, a composite magazine housing or casing for receiving heels. The left planar side housing portion 536 has secured to it by a pair of hinges 540 a door 542 serving as part of the magazine housing. The door 542 has formed in it a slot 544 through which extends a leaf spring latch 546 having a rear end portion thereof secured to the outer face of the right planar side housing 536 and having a V-shaped front end portion spring pressed against the front surface of the door. As will be explained later, the right and left sections 520 of the magazine 94 are adjustable toward and away from each other and in effecting such adjustment the slot 544 in the door 542 rides along the V-shaped front portion of the leaf spring 546. The door 542 may be readily opened and closed for the purpose of loading heels into the magazine 94 by swinging the door forward and rearward against the action of the yieldable V-shaped front end portion of the leaf spring latch 546.

Each of the base members 532 of the side sections 520 of the magazine 94 has secured to it by screws 548 a follower 550 adapted to fit slidingly in an undercut cam slot 552 which is formed in the magazine supporting or top plate 514, said cam slots converging as they extend rearwardly of the magazine 94 and being symmetrically arranged equal distances at opposite sides of a heightwise or vertical median plane 554 of the magazine and the heel handler 98. Each of the base members and its associated follower 550 has secured to it a depending stud 556 which registers in a slot 558 which is formed in the magazine adjusting plate 510 and extends lengthwise at right angles to the heightwise median plane 554. The magazine adjusting plate 510 has a straight forward edge 557 and has formed in it a bore 560 and threaded into this bore is an elongated hand screw 562 which passes through a clearance slot 564 in the top plate 514 and has mounted on it a washer 566 bearing firmly against the top plate, when a shoulder of the screw is forced against said washer by clockwise rotation of the screw (as viewed from above) into the bore, the adjusting plate 510 thus being drawn into clamped relation with the magazine supporting plate by this action.

In view of the foregoing it will be apparent that when the shoulder of the hand screw 562 forces the washer 566 against the top plate 514, the magazine adjusting plate 510 is secured against movement in the rabbets 508, and that after loosening up on the screw the magazine adjusting plate by the use of the screw can be readily moved into different operating positions lengthwise of said rabbets.

When this occurs the side sections 520 of the magazine 94 will be moved equal distances toward and away from each other and also toward and away from the rear section 518 of the magazine into different operating positions.

Figure 16:
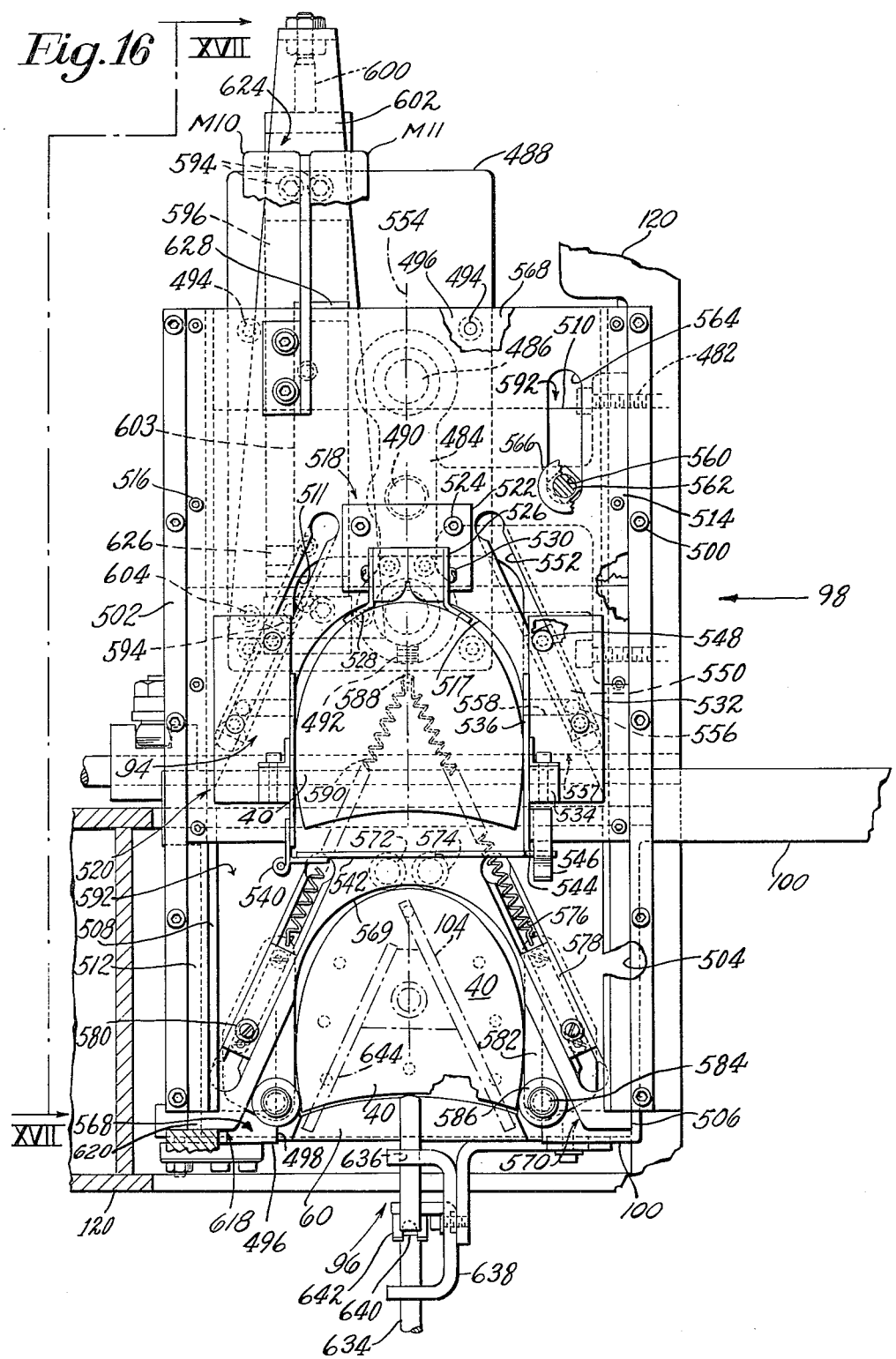
FIG. 16 is a plan view of a portion of the heel handler of the illustrative machine.

It is desirable that the rear ends of the rubber heels 40 stacked in the magazine 94 shall engage the forward faces of the upstanding bars 526 of the rear section 518 of the magazine, said bars being rounded off at their forward inner portions as best illustrated in FIG. 16 so as to be engaged by the rear ends of the heels at spaced points, the planar spaced side housing portions 536 of the side sections 520 of the magazine 94 engaging by point contacts the widest portions of the heels. Irrespective of the sizes of the heels stacked in the magazine 94 it is desirable that the forward breast corners of the heels shall be positioned at predetermined slight distances from the door 542 of the magazine when the rear ends of the heels engage with the front faces of the upstanding bars 526 and the planar side housing portions 536 engage the sides of the heels. As will be explained later, when the rubber heels 40 fall from the magazine 94 by gravity upon an upper face 568 of the supporting bed 496 it is desirable that the heels shall be oriented symmetrically lengthwise with relation to the heightwise median plane 554 of the magazine and the handler 98 and by providing a magazine 94 such as above described the heel is thus oriented in the magazine and will drop onto the supporting bed in this position.

The heel transfer slide 506 has at its forward end a U-shaped opening 569 which has forwardly flared straight entrance sides 570. Journaled upon bearing pins 572 carried by and depending from the heel transfer slide 506 at the rear end of the U-shaped opening 569 and arranged at equal distances from the opposite sides of the heightwise median plane 554, are a pair of rolls 574 which, as the slides moves forward from its rearward or heel receiving position, engage one of the rubber heels 40 which has dropped onto the upper face 568 of the supporting bed 496 from the magazine 94. It will be noted that the heel transfer slide 506 has formed in it at opposite sides of the U-shaped opening 569 a pair of cam slots 576 which are T-shaped in cross section and are parallel to the corresponding cam slots 552 formed in the top plate 514 and which are arranged equal distances at opposite sides of the heightwise median plane 554. Movable along the cam slots 576 of the heel transfer slide 506 are complemental follower bars 578 which have secured to them upstanding studs 580 respectively and flat plates 582 which constitute flanges of the follower bars and are slidable along the bottom face of the heel transfer slide, said flanges having secured to their forward inner portions upstanding bearing pins 584 upon which are rotatably mounted upstanding gripper rolls or grippers 586 which, as will be explained later, are adapted to engage the forward portions of sides of the heels carried by the slide. Attached at their opposite ends to the rear ends of the follower bars 578 respectively and to a stud 588 secured to the transfer slide 506 are springs 590 which constantly urge the follower bars 578 rearwardly along their associated slots 576 and accordingly when the rubber heel 40 is removed from the heel transfer slide 506, as will appear later, the springs move the follower bars rearwardly along their associated slots 576 until the rear ends of the bars engage faces defining the rear ends of said slots.

Shortly before the heel transfer slide 506 of the handler 98 moves rearward to a position in which its U-shaped opening 569, which is slightly larger than a corresponding rear end portion of the largest heel to be accommodated, has its rear end moved below and just rearward of the lowermost rubber heel 40 in the magazine 94, the upstanding studs 580 of the follower bars 578 engage the front end of the magazine adjusting plate 510, the cam slots 576, as the heel transfer slide 506 continues its rearward movement, sliding along the follower bars which together with the gripper rolls 586 are opened up and are moved equal distances away from each other so that the lowermost heel which heretofore has been prevented from dropping onto the upper face 568 of the supporting bed 496 by a flat upper face 592 of the heel transfer slide, may drop further downward into the U-shaped openings 517, 511 respectively of the top plate 517 and the adjusting plate and onto the face 569 of the supporting bed.

It will be noted that the initial setting of the adjusting plate 510 lengthwise of the rabbets 508 determines the positions of the planar side housing portions 536 of the side sections 520 of the magazine 94 and of the door 542 of said magazine and also determines the positions of the gripper rolls 586 at the rearward limit of their movement with the heel transfer slide 506. After loading the magazine with rubber heels 40 of a size suitable for accommodating the work on hand, the operator loosens the screw 562 and moves the adjusting plate 510 rearwardly until the planar side housing portions 536 of the side sections 520 of the magazine 94 substantially engage the sides of the rubber heels 40 in the magazine, the forward breast corners of the heels at that time being slightly spaced from the door 542, the cam slot 552 being inclined at a suitable angle to the heightwise median plane 554 to satisfy this condition. With the conditions such as above described the rear ends of the rubber heels 40 in the magazine will be substantially in engagement with the upstanding bars 526 of said magazine. By providing the above described magazine 94 it is possible accurately to control the position of the rubber heel 40 as it drops onto the upper face 568 of the supporting bed. By causing, irrespective of the size of the rubber heels 40 being used, the gripper rolls 586 to be moved apart a substantially constant amount which is only slightly greater than the distance required to receive the heels, and immediately to move them into contact with the sides of the heel as said heel moves forward together with the heel transfer slide 506, a high degree of accuracy is obtained in the positioning of the heel which accuracy is necessary in an automatic feed of the type herein described. Moreover, it will be noted that by reason of the initial setting of the gripper rolls 586 as above described, said rolls engage the sides of heels of different sizes at substantially the same distance from the breasts of the heels.

Secured by screws 594 (FIGS. 16, 17 and 18) to the supporting plate 488 is a cylinder 596 having a bore in which slides a piston 598 fixed to a connecting rod 600 secured at its rear end to a coupling 602 secured by screws 604 to the rear end of the heel transfer slide 506, said coupling having a cam 603 secured to it. Chambers 606, 608 (FIG. 17) formed by the cylinder 596 and faces 610, 612 of the piston 598 respectively are connected to lines 614, 616 open alternately to high pressure air and air open to exhaust whereby to move the piston forwardly and rearwardly of the machine in the cylinder to cause the heel transfer slide 506 to deliver the rubber heel 40 received from the magazine 94 to the transfer station 96 and thereafter to return to its rear heel receiving position beneath the magazine 94. Flow of air in the lines 614 and 616 is controlled by electro-pneumatic means hereinafter described. Forward movement of the heel transfer slide 506 is limited by the engagement of a forward face 618 of the slide with a stop 620, hereinafter referred to, and rearward movement of the slide is limited by the bottoming of the piston 598 in the cylinder 596.

The cam 603 has a flat horizontally arranged upper face 622 and front and rear ramps 626, 628 extending between the face 622 and an upper flat face 624 of the coupling 602. When the machine is idle plungers 630, 632 of normally closed and normally open microswitches M10, M11 respectively, which are secured to the top plate 514, are in engagement with the upper face 622 of the cam plate 602, the plungers causing contacts of the switch M10 to be held open and those of the switch M11 to be held closed.

When the heel transfer slide 506 is at the end of its rearward or retractive movement, the U-shaped opening 569 of the slide is just rearward of and below the rear end of the lowermost rubber heel 40 in the magazine 94, said heel, before this time, having been supported by the upper face 592 of the slide. During the last part of the rearward movement of the heel transfer slide 506 the lowermost heel in the magazine is forced by frictional drag of the heel transfer slide upon said heel against the forward faces of the upstanding bars 526 and then drops by gravity into the U-shaped opening 569 in the slide and onto the upper face 592 of the supporting bed 496, the rear end of the heel being arranged just forward of the rolls 574 on the heel transfer slide 506 and the gripper rolls 586, as above explained, being opened up sufficiently to permit the forward end of the heel to drop down between them onto said upper face 592.

As the heel transfer slide 506 moves forwardly, as above described, the back rolls 574 engage the rubber heel 40 on the upper face 568 of the supporting bed 496 moving it forwardly and as the studs 580 on the follower bars 578 leave the front face 557 of the magazine adjusting plate 510, the springs 590 immediately force the gripper rolls 586 against the opposite forward portions of the sides of the heel and cooperate with the rear rolls 574 to support said heel against movement.

In order to insure against any displacement of the rubber heel 40 in the transfer slide 506 due to impact, as this slide engages the stop 620, there is provided a holding plunger 634 (FIGS. 1, 16, 19 and 20) which, just before the slide reaches the forward end of its stroke, is engaged by the central portion of the breast of the rubber heel 40. The plunger 634 is slidingly mounted in alined bores 636 formed in a yoke-shaped bracket 638 secured to the main frame 120 and has formed in it a circular groove 640 in which fits a bifurcated upper end of a stiff leaf spring 642 secured at its lower end to the bracket.

As will be explained later, the heel tansfer slide 506 is moved forwardly during the driving of nails into the work and as this slide starts to move forwardly the front ramp 626 of the cam 603 slides past the plunger 630 of the microswitch M10 thereby allowing the microswitch M10 to be closed by spring action. Just before the heel transfer slide 506 engages the stop 620, the rear ramp 628 of the cam 603 slides past the plunger 632 of the microswitch M11 secured to the top plate 514 with the result that this plunger operating against spring action closes the switch. The tamper 104 is V-shaped as viewed in plan, an apex end of the tamper engaging the rear central portion of the rubber heel 40 delivered to the transfer station 96 by the heel transfer slide 506 and legs 644 of the tamper extending forwardly and outwardly across the forward, lateral breast portions respectively of the heel as shown in dash-lines (FIG. 16).

Screwed to the tamper 104 is a vertical rod 646 the upper end of which is fixed to a piston 648 reciprocable in a bore of a cylinder 650, said piston being normally held in a raised position in the cylinder by a spring 652. A chamber 654 formed by the cylinder 650 and an upper face 656 of the piston 648 is connected to an air line 658 which is alternately open to high pressure air and to air open to exhaust as will be hereinafter explained.

The cylinder 650 is fixedly mounted on a beam 660 journaled upon a vertical bearing pin 662 opposite ends of which are secured to upper and lower flanges 666a, 666b of a slide plate 666, the beam fitting between said flanges and resting upon the lower flange. The slide plate 666 is mounted for movement along undercut guideways 668 formed by upper and lower gibs 670 which are screwed to the main frame 120. The slide plate 666 may be initially secured in different adjusted positions along the guideways 668 by the use of an adjusting screw 672 rotatably mounted in a header 674 which is secured to the forward ends of the gibs 670 and is threaded into the slide plate, said screw being held in its adjusted position by a leaf spring 676 operating against a serrated drum portion of the screw. In order initially to set the slide plate 666 and accordingly the tamper 104 in a predetermined operating position forwardly and rearwardly of the machine the upper flange 666a of the plate has secured to it a pointer 678 registering with a graduated scale 680 mounted on the upper gib 670. The above-mentioned stop 620 for limiting forward movement of the heel transfer slide 506 is secured by screws 682 to the lower flange 666b of the slide plate 666. The tamper carrying beam 660 may be set in active and inactive positions established by the engagement of a spring-pressed ball detent 684, which is slidable in a vertical recess in the beam, with recesses 686, 688 respectively formed in the bottom face of the upper flange 666a of said beam.

Preparatory to loading the magazine 94 with rubber heels 40 it is desirable to swing the tamper 104 to its inactive position shown in FIG. 19. Such movement is readily effected by manually moving the beam 660 and accordingly the tamper 104 forwardly about the fulcrum pin 662 after dislodging the spring-pressed ball detent 684 from the recess 686 of the upper flange of the slide plate 666 and moving the beam to a position in which the spring-pressed ball detent registers in the recess 688.

Secured to the slide plate 666 is a three contact, double-throw microswitch M9 having a plunger 690 which is engaged, when the tamper 104 is in its rear or active position, by a striker 692 mounted on the beam 660 whereby to hold a bridging member 694 (FIG. 28) of the microswitch across contacts 696, 698 of the microswitch. When as will be hereinafter explained the tamper 104 is moved to its inactive position shown in FIG. 19 the striker 692 is moved away from the plunger of the microswitch with the result that the bridging member 694 is moved across contacts 696, 700 of the microswitch whereby to insure that the heel handler 98 cannot be power operated at this time.

The base lift gage 64 in function is similar to the base lift gage (33) disclosed in the above-mentioned Patent No. 3,071,775 and comprises the arms 478 which correspond to the arms (60) disclosed in said application. After the rubber heel 40 in the heel ring 60 has been moved to the heel attaching station 62 below the shoe support or jack 54 and above the nailing die 56 in its forward position, the base lift 42 is manually placed on the rubber heel 40, as above explained, the lateral breast edges of the heel being forced against the corners 480 of said arms which are spread apart slightly against spring action by pressure of the manually presented base lift, said arms, after the operator has released the base lift, moving back by spring action to grip said lift. As will appear, the arms 478 are moved equal distances toward and away from each other and toward and away from the vertical median reference plane 57 of the machine, said arms being initially raised or lowered as an entirety to adjust them to their proper heightwise operating positions, and being initially adjusted as an entirety forwardly and rearwardly of the machine to locate them in the proper lengthwise operating positions. In order to adjust the arms 478 so that they are spaced equal distances at opposite sides of the vertical median reference plane 57 of the machine, the arms are initially adjusted as an entirety widthwise.

Figure 23:
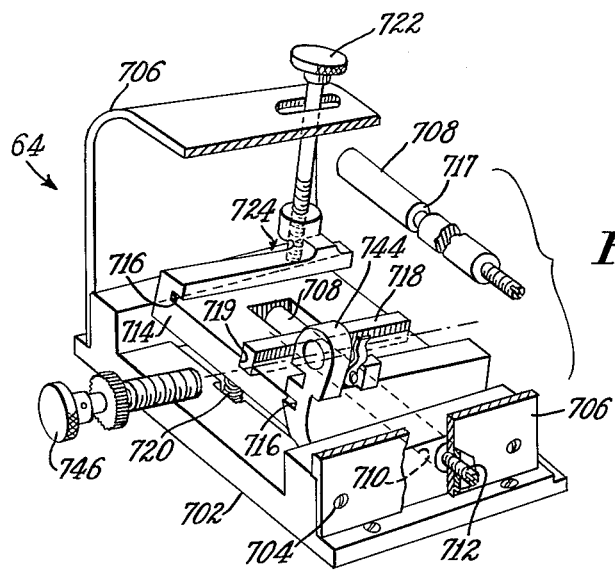
FIGS. 23 and 24 show in perspective a base lift gage of the machine.

The base lift gage 64 comprises a base block 702 (FIG. 23) to which is secured by screws 704 a U-shaped cover 706. Journaled on a bearing rod 708, which fits in longitudinal bores 710 (only one shown) of the base block 702 and has a reduced end 712 threaded into the cover 706 is a guide block 714 having undercut guideways 716 extending forwardly and rearwardly of the machine.

The bearing rod 708 has formed in it a circular groove 717 in which engages a spline 718 having its lower portion fitting in a groove 719 formed in the upper face of the guide block 714. The guide block 714 is constantly urged clockwise as viewed in FIG. 23 by a coil spring 720 interposed between the base block 702 and the guide block 714, clockwise movement of the guide block 714 being limited by the engagement of a hand screw 722 which is threaded into a boss portion of the guide block and engages a face 724 of the base block 702.

Slidable in the guideways 716 of the bearing block 714 is a carrier plate 726 having secured to it a pair of upstanding pins 728 on which the base lift positioning arms 478 are journaled, said arms being provided with intermeshing segment gears 730 and having at their rear ends opposed projections extending into the opposite ends of a compression spring 732 which constantly urges the forward work engaging portions of said arms toward each other. Mounted on the carrier plate 726 is a cover 734 which is thicker at its rear end than at its forward portion and is secured by screws 736 to the slide 726, a space formed between the slide and the plate serving to accommodate the rear portions of the arms 478 and the spring 732.

Secured to the cover 734 is a lug 738 having threaded through it a screw 740, a rear end of which bears against an upstanding flange 742 of the left heel positioning arm 478 whereby to limit inward movement of the forward ends of the arms acted upon by the coil spring 732. The guide block 714 has an integral upstanding boss 744 in which fits rotatably a shoulder screw 746 a threaded rear end portion of which meshes in a threaded bore of a boss 748 secured to the cover 734, the construction and arrangement being such that by rotating the screw 746 the cover, together with the carrier plate 726 secured to it, may be initially adjusted along the guideways 716. In setting up the machine it is desirable that the heel positioning arms 478 shall be equidistant from the vertical reference plane 57 of the machine and accordingly the bearing rod 708 is shifted widthwise of the machine by rotating it in the longitudinal bores 710 of the base block 702.

In view of the foregoing it will thus be clear that the base lift positioning and retaining arms 478 may be initially tilted into raised or lowered operating positions by turning the screw 722 and may be suitably moved to the desired forward and rearward operating positions by rotating the screw 746, the screw 740 being rotated initially to vary the spread of the base lift positioning and retaining arms which as above stated are arranged equidistant from the opposite sides of the vertical reference plane 57.

The forepart gage 84 comprises a platform 750 (FIG. 25) which is secured by screws (not shown) to the door 379 and has secured to its left side a smooth cylindrical rod 752. Mounted for pivotal movement on a fulcrum pin 754 secured to the platform 750 is a roughened rod 756 in the forward end portion of which is slidable laterally in a slot 758 formed in the platform.

Mounted on the rods 752, 756 is a T-shaped guide 760 having a cylindrical bore 762 in which the rod 752 fits slidingly and having an elongated opening 764 through which the rod 756 passes with a clearance sufficient to permit it to be swung about the pin 754, a spring 766 being interposed between an inner side wall of the opening 764 and the rod to insure that the rod shall be constantly urged against a ribbed outer side of the opening.

Secured to the T-shaped guide 760 are horizontal transversely disposed rods 768 on which fit slidingly left and right blocks 770, 770a. Rotatably mounted in the T-shaped guide 760 and having right and left threaded portions meshing in threaded bores in the blocks 770, 770a is a screw 772 which may be rotated to cause the blocks to be moved equal distances in opposite directions toward and away from each other and from the vertical reference plane 57. Rigidly secured to the block 770a is the right shoe rest 86a and pivotally mounted on a fulcrum pin 774 carried by the left block 770 is the left shoe rest 86 which is normally held in its full line vertical position on the block by a spring-pressed detent 776 slidable in the block and normally bearing in a recess (not shown) of the shoe rest. In order to fully open the door 357 the shoe rest 86 is swung to its dash-line position in the block.

As is well known in the art, the right and left shoe rests 86a, 86 are engaged respectively by the ball portions of right and left outsoles of shoes being operated upon in the machine to insure that the heightwise median planes 55 of the heel seat portions of the shoes shall be coincident during the heel attaching operation within the vertical reference plane 57 of the machine. The shoe rests 86, 86a may be initially moved to different positions forwardly and rearwardly of the machine by swinging the roughened rod 756 clockwise against the action of the spring 766 and then sliding the T-shaped guide 760 forward or rearward to the desired position. When the T-shaped guide 760 has been properly positioned the rod 756 is released and moves under action of the spring 766 into engagement with the ribbed outer surface of the opening 764 thereby insuring against any forward or rearward movement of said guide from its set position. Initial adjustment of the forepart rests 86, 86a equal distances toward and away from each other and accordingly toward and away from the vertical reference plane 57 of the machine is effected by turning the screw 772.

Figure 26:
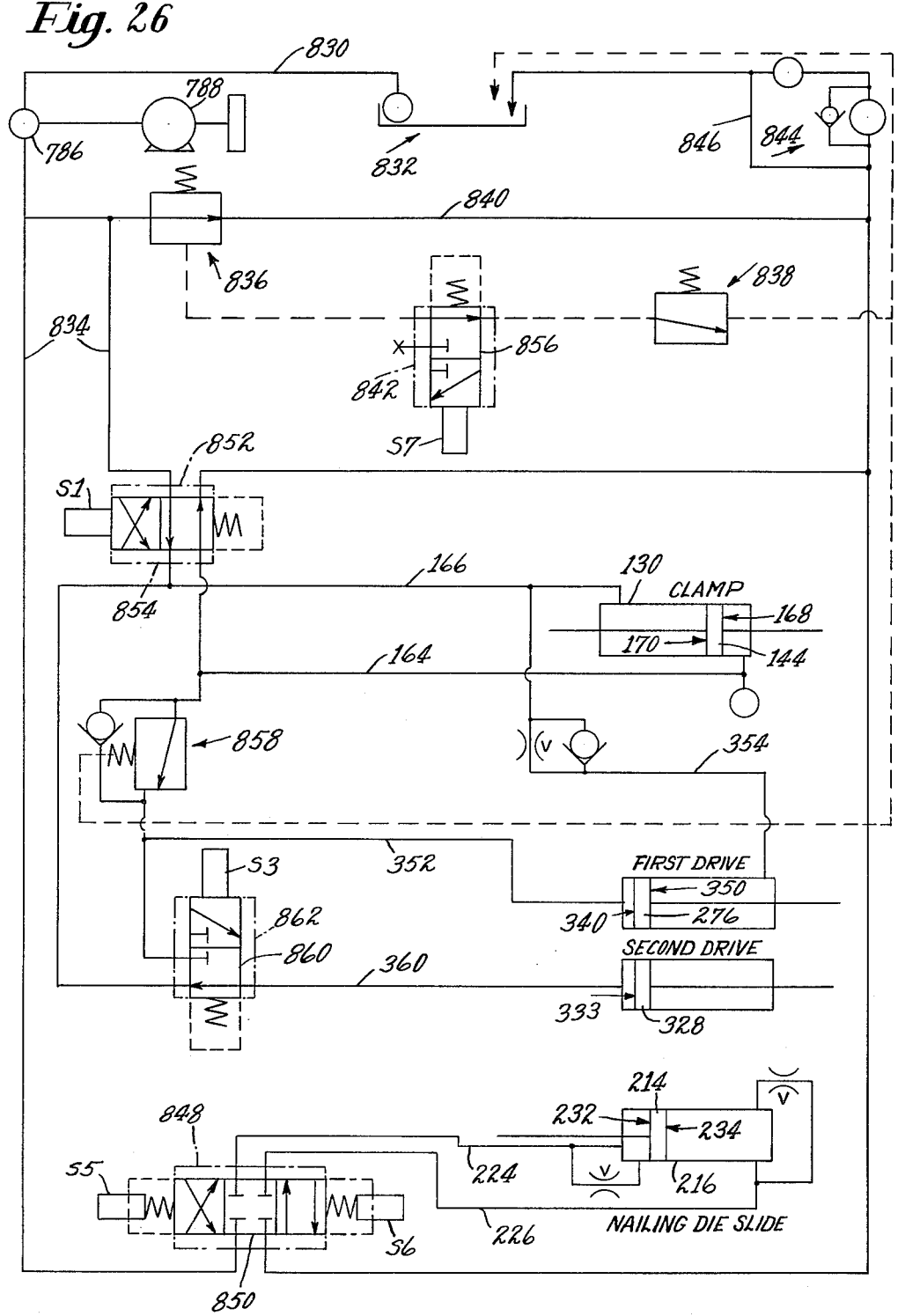
FIG. 26 is a view showing schematically a flow chart of fluid pressure (oil) operating mechanism for powering the heel attaching machine per se.
Figure 27:
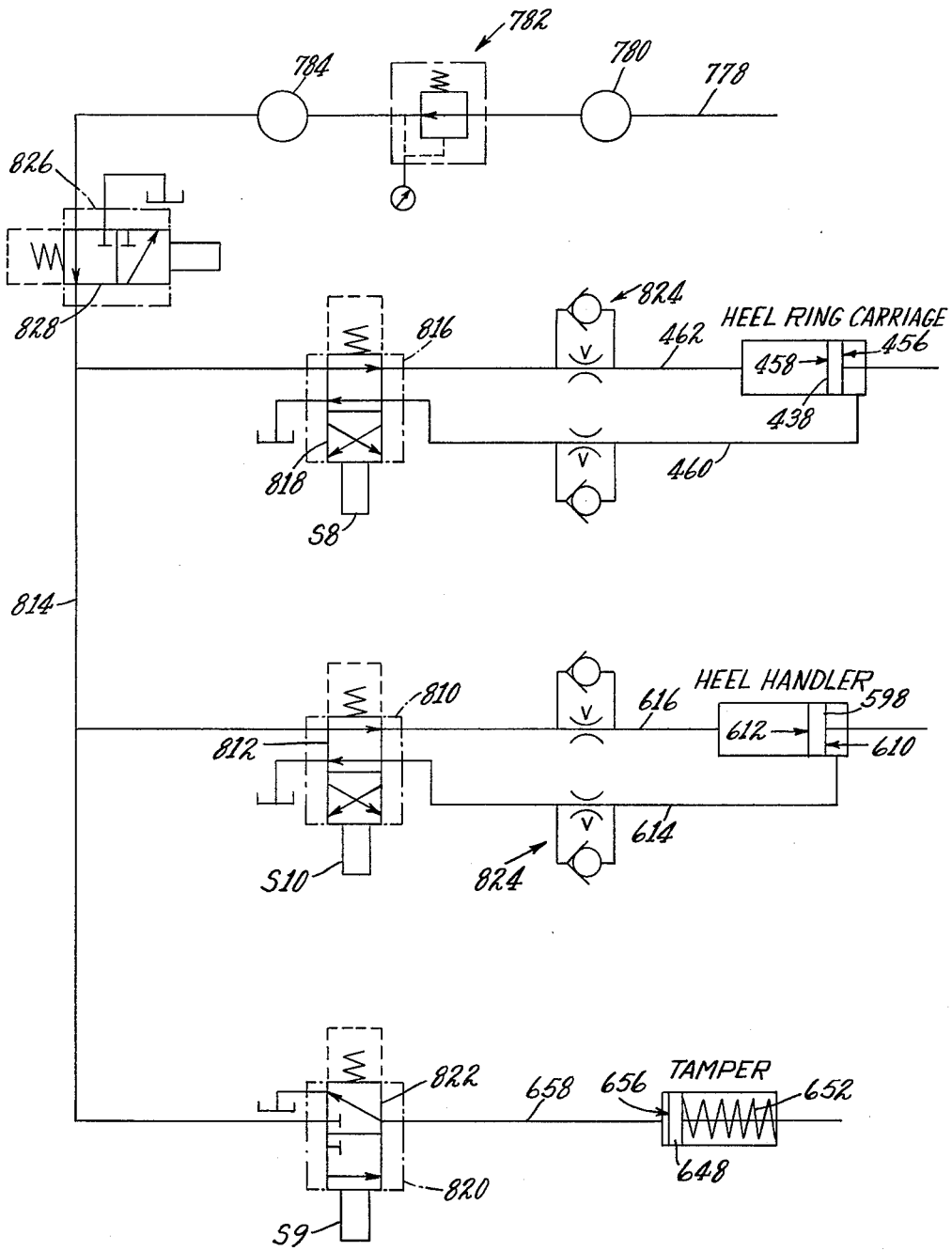
FIG. 27 is a view showing schematically a flow chart of the fluid pressure (air) operated mechanism for powering the automatic heel loader of the machine.
Figure 28:
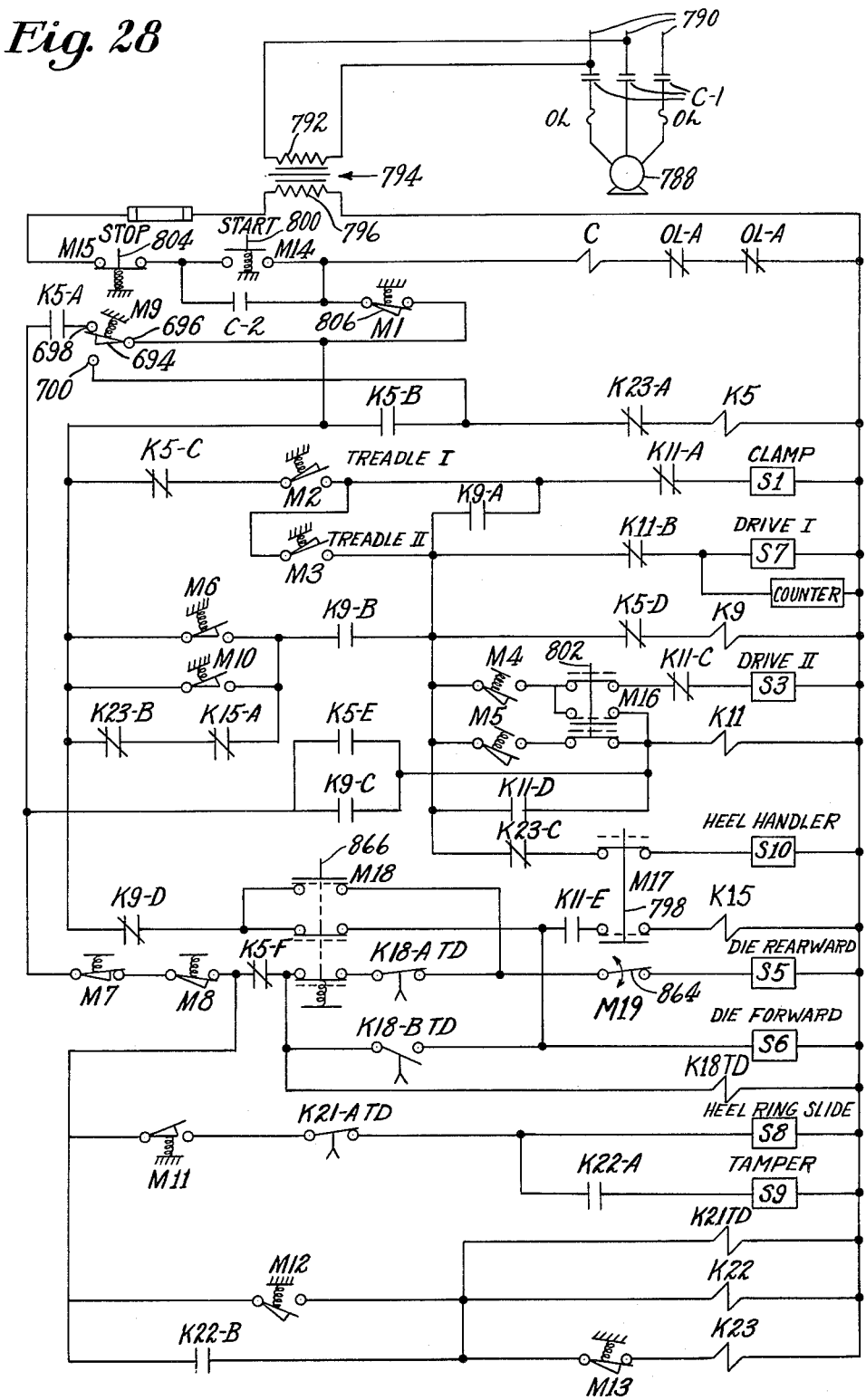
FIG. 28 is a schematic wiring diagram for use in describing the operation of the machine.

As above explained, the mechanism for automatically delivering rubber heels 40 from the magazine 94 to the heel attaching station 62 is powered by compressed air tapped from a factory compressed air line 778 (FIG. 27) which includes an air filter 780, an air pressure regulator 782 and an air lubricator 784, power for operating the heel attaching machine per se through its heel attaching cycle being supplied by a rotary oil pump 786 (FIG. 26) driven by an electric motor 788 (FIGS. 26 and 28). Electricity for operating the motor 788 and for operating aforesaid mechanism, as well as mechanism hereinafter described for controlling the operation of the heel attaching machine per se and the heel loader which automatically delivers rubber heels 40 to the machine, is supplied from a main power line 790 (FIG. 28) to a primary coil 792 of a transformer 794, opposite ends of a secondary coil 796 of which are connected to opposite sides of a plurality of control circuits shown schematically in FIG. 28. Air pressure powered means for operating and controlling the operation of the automatic heel loader is shown schematically in FIG. 27 and oil powered means for operating and controlling the operation of the heel attaching machine is shown schematically in FIG. 26.

Assuming that the machine is idle and the magazine 94 is empty and that the operator is ready to attach heels 40 to shoes 48 of a given size, the machine being set up for automatic heel loading by initially moving a bridging member 798 (FIGS. 1 and 28) of a selector heel loader switch M17 to its full-line position (FIG. 28), the operator depresses a plunger 800 of a normally open start switch M14 across the contacts of this switch causing a coil C of a motor starter to be energized with the result that normally open contacts C-1 and C-2 of the motor starter are closed. The closing of the contacts C-1 of the motor starter causes the motor 788 to operate whereby to power the oil pressure actuated mechanism of the machine. Preparatory to operating upon work a bridging member 802 of a manually actuated single and double nail drive selector switch M16 is moved to its full or dash-line position in accordance with whether the machine is to "double" drive or "single" drive respectively.

As soon as the operator closes the start switch M14 the plunger 800 of this switch is usually released and the switch again opens under spring action. Meanwhile, however, the contacts C-2 of the motor starter have been closed thereby establishing a holding circuit for the coil C of the motor starter. In the line including the start switch M14 is a normally closed stop switch M15 including a plunger 804 which may be manually depressed to an open setting to stop the machine, this line also including over-load relay contacts OL–A. The circuit of the machine also includes the above-mentioned switch M1 (FIGS. 10, 12 and 28) provided with a swing bar 806 (FIG. 28) which is acted upon by the plunger 385 (FIGS. 10 and 12) of this valve in response to the closing of the door 379 of the machine, the construction and arrangement, as above explained, being such that when the door is open the swing bar is spring actuated out of bridging relation with contacts of the switch and accordingly the machine cannot be cycled.

As above explained, when the machine is at rest the heel ring 60 is in its operating position over the nailing die 56 and beneath the jack or holddown 54 and the heel gripper rolls 586 (FIGS. 16, 18, 19 and 20) of the heel transfer slide 506 are in open positions over the supporting bed 496 and beneath the magazine 94, the tamper 104 being in its raised position.

Preparatory to loading the magazine 94 with rubber heels 40 the operator swings the tamper 104 to its forward inactive position shown in FIG. 19 to allow access to the magazine 94. Associated with the tamper 104 is the bridging member 694 (FIG. 28) of the 3-contact double throw switch M9, the striker 692 (FIGS. 15 and 19) normally holding the bridging member against spring action in a position in which it bridges contacts 696, 698 of the switch. The manual swinging of the tamper 104 forwardly to its inactive position allows the bridging member 694 to bridge the contacts 696, 700 of the switch M9 and accordingly causes a coil K5 of a control relay to be energized with the result that normally open contacts K5–A, K5–B and K5–E of this control relay are closed and normally closed switches K5–C, K5–D and K5–F are opened. The closing of the switch K5–B establishes a holding line for maintaining the control relay coil K5 energized when as will be explained, the tamper is returned to its active position resulting in the bridging member 694 of the switch M9 being swung back to its rest position shown in FIG. 28. The opening of the switch K5–C insures that so long as the relay coil K5 is energized the heel attaching machine per se cannot be operated should the treadle switch M2 be accidentally closed. The closing of the contacts K5–A, K5–E and the opening of the contacts K5–D and K5–F sets up lines of control circuits for subsequent operations.

After the magazine 94 has been loaded with heels the operator swings the tamper 104 back to its active position shown in FIG. 20 causing the bridging member 694 of the switch M9 to bridge the contacts 696, 698 of this switch against spring action and thus causing a coil K11 of a control relay including normally open contacts K11–D and K11–E of this relay to be closed and normally closed contacts K11–A, K11–B and K11–C of this relay to be opened. The opening of the contacts K11–A, K11–B and K11–C insures against a clamp solenoid S1 (FIGS. 26 and 28), a first drive solenoid S7 and a second drive solenoid S3 hereinafter referred to being energized and the closing of the contacts K11–D results in a solenoid S10 (FIGS. 27 and 28) of a solenoid valve 810 (FIG. 27) being energized. The closing of the contacts K11–E sets up a control circuit for subsequent operation hereinafter referred to.

The energizing of the solenoid S10 causes a plunger 812 of the solenoid valve 810 to shift from its full-line position (FIG. 27) to its dash-line position. When this occurs a pressure line 814 connected to the pressure regulator 782 is connected through the solenoid valve 810 and the line 614 (FIGS. 2, 17 and 27) to the face 610 of the piston 598 and the face 612 of this piston is connected through the line 616 and this soleniod valve to exhaust with the result that the piston 598 which is operatively connected to the transfer slide 506 travels forwardly in the cylinder 596 and accordingly a heel secured to said slide is moved to the transfer station 96, forward movement of the slide being limited by the engagement of the forward face 618 of the slide with the stop 620.

As the transfer slide 506 starts to move forwardly the front ramp 626 of the cam 603 moves forwardly beneath the plunger 630 of the normally closed microswitch M10 permitting said plunger to drop by spring action and accordingly causing this microswitch to close. The closing of the microswitch M10 sets up a circuit for subsequent operations. Just before the heel transfer slide 506 reaches the forward end of its movement the rear ramp 628 of the cam 603 runs forwardly beneath the plunger 632 of the normally open microswitch M11 thus permitting this plunger to be depressed and causing this microswitch to close against spring action.

The closing of the microswitch M11 causes a solenoid S8 (FIGS. 27 and 28) of a solenoid valve 816 to be energized with the result that a plunger 818 of this solenoid valve is moved to its dash-line position (FIG. 27) causing through this solenoid valve and the line 460 (FIG. 7 and 27) the pressure air line 814 to be open to the face 456 of the piston 438 and causing through this solenoid valve and the line 462 the face 458 of the piston to be opened to exhaust. When this occurs the heel ring 60 secured to the carriage 100 is moved from its retracted or heel attaching position above the nailing die 56 to its projected or heel receiving position at the heel transfer station 96.

Figure 21:
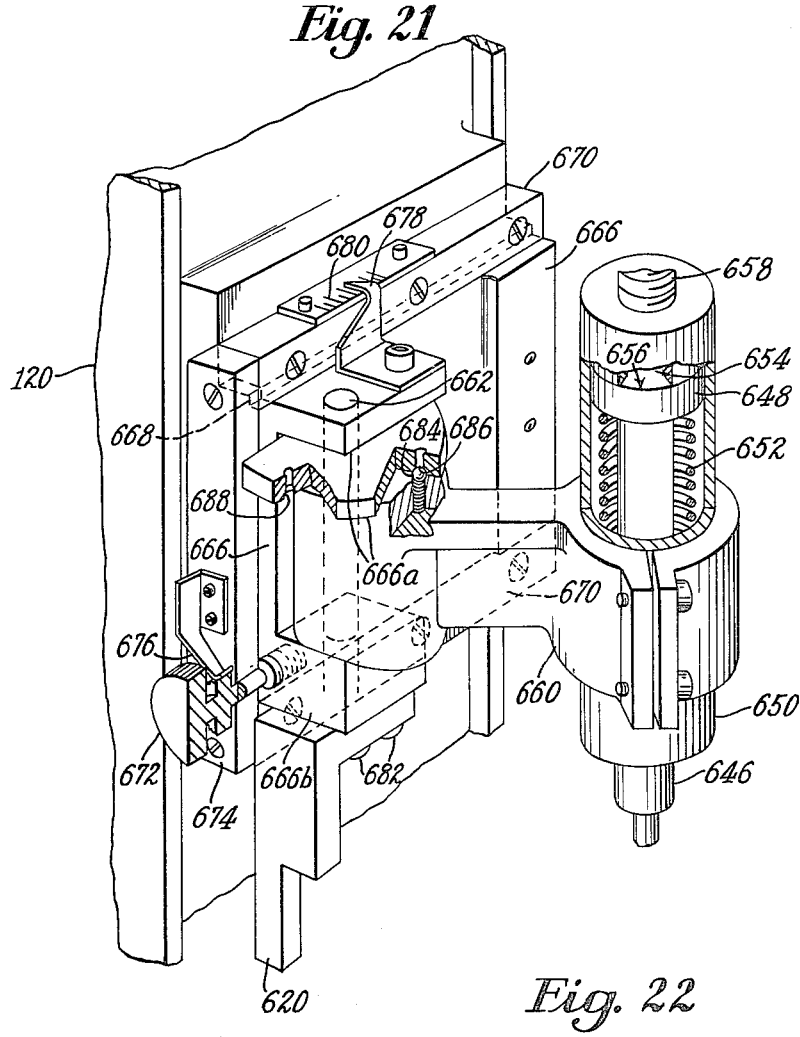
FIG. 21 is a perspective view showing details of the heel tamper and mechanism for supporting and initially adjusting said tamper.

During the first part of the downward movement of the piston 438 to transfer the heel ring 60 from its heel attaching to its heel receiving position, the striker 446 movable with the piston moves away from the plunger 448 of the normally open microswitch M13 allowing this switch to open under spring action and just before the piston reaches its lowered position the striker 446 engages the plunger 450 of the normally open microswitch M12 causing this switch to be closed against spring action. When the microswitch M12 is closed control relays including coils K21 TD and K22 respectively of a time delay relay and a control relay are energized. The energizing of the control relay coil K22 causes normally open switches K22–A and K22–B of this relay to close, the closing of the contacts K22–B establishing a holding circuit for purposes which will appear. The closing of the contacts K22–A serves to energize a solenoid S9 of a solenoid valve 820 with the result that a plunger 822 of this solenoid valve moves to its dash-line position (FIG. 27) and accordingly high pressure air in the line 814 is available through the solenoid valve 820 and the line 658 (FIG. 1, 15 and 21) for the face 656 of the piston 648 which is operatively connected to the tamper 104 and is depresed against the action of the spring 652 to force the rubber heel 40 in the heel transfer slide 506 into the heel ring 60 waiting at the transfer station 96.

The time delay relay coil K21 TD has contacts K21–ATD and after this relay coil has been energized for a predetermined period, which may be varied in accordance with the initial setting of the contacts of this relay and which is sufficient to allow the rubber heel to be transferred to the heel ring, said contacts are opened with the result that the solenoids S8 and S9 are de-energized. When this occurs the plunger 822, 818 of the solenoid valves 820, 816 respectively return to their full-line positions (FIG. 27), the line 658 (FIGS. 1, 15, 21 and 27) connected to the face 656 of the tamper piston 648 being open to exhaust and the tamper returning to its raised position under the action of the spring 652, and air open to pressure and to exhaust being available respectively for the faces 458, 456 respectively of the piston 438 with the result that the heel ring mounted on the carriage 100 is moved to its heel attaching position above the nailing die.

During the first part of the movement of the heel ring 60 from its heel receiving position the striker 446 secured to the piston rod 436 moves away from the plunger 450 of the microswitch M12 thus allowing this switch to open to its reset starting position under spring action. Just before the heel ring 60 reaches its heel attaching position, the plunger 448 of the microswitch M13 is depressed by the striker 446 on the piston rod 436 thus causing a coil K23 of a control relay to be energized and accordingly normally closed contacts K23–A, K23–B and K23–C of this relay to be opened. When the contacts K23-C are opened the solenoid S10 is deenergized and this results in the plunger 812 of the solenoid valve 810 moving back to its full-line starting position shown in FIG. 27 and accordingly air under pressure being available for the face 612 of the piston 598 while the face 610 of this piston is open to exhaust, thereby causing the heel transfer slide 506 of the handler 98 to return to its rearward position below the magazine. When the control relay contacts K23–A are opened the control relay coil K5 is deenergized and this results in deenergizing the control relay coils K23 and K11 and in resetting the various control elements, the heel 40 having been delivered to its heel attaching position and the heel handler 98 being in its starting position, the machine being ready for the attachment of the heel to the shoe.

In order to control the speed of the heel transfer slide 506 and the heel ring carriage 100 in opposite directions the air line 614, 616, 460 and 462 have interposed in them speed control units 824 which are well known commercially. In order to permit the operator quickly and effectively to connect the air system of the heel handler 98 to exhaust and accordingly to "dump" the system for purposes of repair or to relieve jamming, the line 814 has interposed in it a valve 826 (FIG. 27) comprising a plunger 828 which may be manually actuated between its full and dash-line operating and dumping positions respectively.

Figure 15:
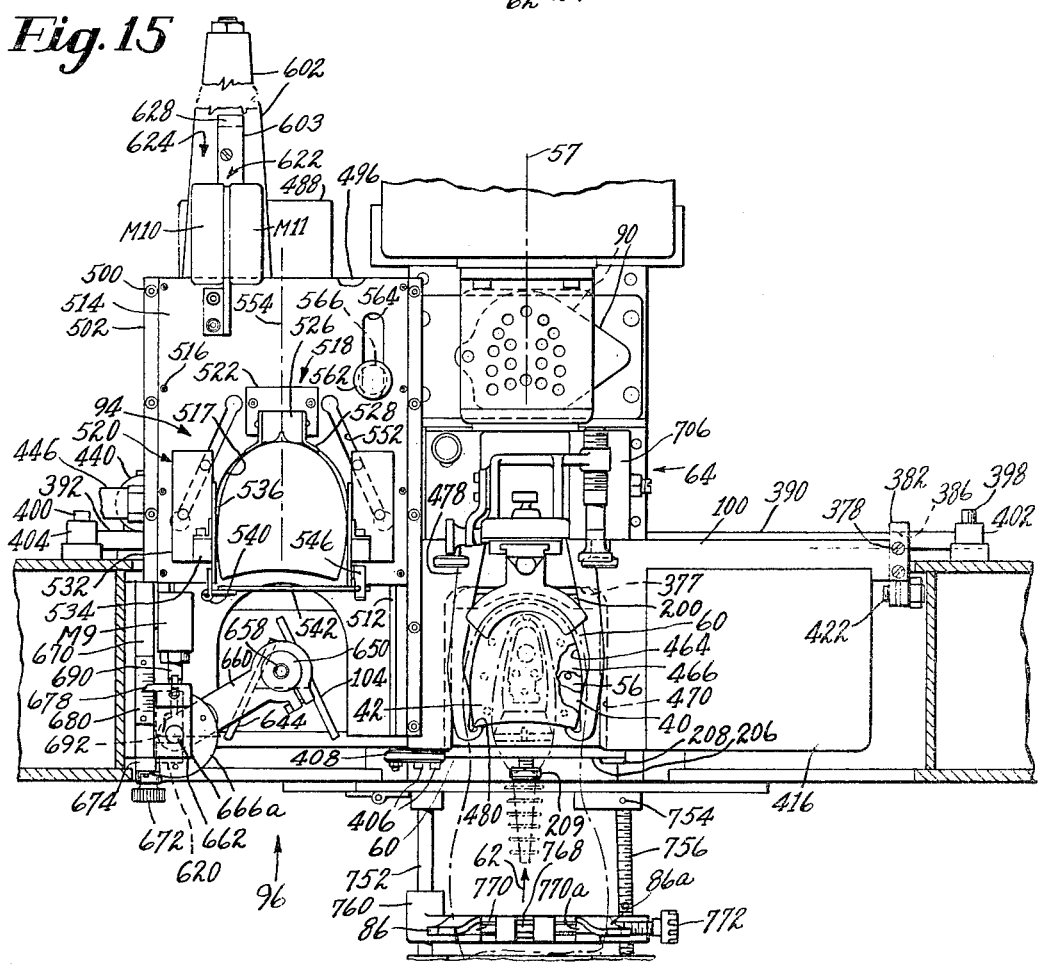
FIG. 15 is a plan view showing details of a heel handler and of the heel ring carriage of the illustrative machine.

The heel attaching machine being powered and having been set up for double drive by moving the bridging member 802 (FIGS. 1 and 28) of the nail drive selector switch M16 to its full line position shown in FIG. 28 and also having been set up for automatic rubber heel delivery by moving the bridging member 798 of the selector heel loader switch M17 to its full-line position, the operator with his left hand removes the shoe 48 from a rack (not shown), picks up the base lift 42 with his right hand positions said base lift over the rubber heel 40 in the heel ring 60, as shown in FIG. 19, by the use of the positioning arms 478 which form part of the base lift gage 64 and are engaged by the forward breast corner portions of the heel. The operator now grasps the shoe with both hands and positions the work so that the upper face of the back cone of the last 50 upon which the shoe 48 is mounted, is arranged beneath the lower face of the jack or holddown 54 in its upright position, the operator guiding the rear end of the shoe so that its rand crease rests against a lower edge of the back gage 76, the inner side of the forepart of the shoe in the vicinity of the break line of its outsole being brought into engagement with one or the other of the upstanding arms 86, 86a of the forepart gage 84 as shown in FIG. 15 in accordance with whether the shoe is a left or a right.

The oil pump 786 (FIG. 26), which supplies high pressure oil for powering the heel attaching machine per se receives, through a line 830, oil from a sump 832 and delivers said oil to a pressure line 834. The pressure of oil in the line 834 is regulated partly by a maximum pressure relief valve 836 which, when an associated pilot relief valve 838 is open to the maximum pressure valve 836, spills oil at a low pressure controlled by the pilot relief valve, through a line 840 back to the sump 832 and which, when the pilot relief valve 838 is cut off from the maximum pressure relief valve 836 by a first drive solenoid valve 842 hereinafter referred to, spills oil into the line 840 at high pressure, for example 2500 lbs. per square inch. When the machine is idle but powered the solenoid valve 842, as will appear later, permits flow of oil between the high pressure relief valve 836 and the pilot relief valve 838 and accordingly the pressure in the line 834 is low, for example 200 lbs., and is controlled by the setting of the pilot relief valve. Maximum pressure valves and pilot relief valves of different commercial types may be used and if desirable the line including the solenoid valve 842 may include an independent pressure relief valve which is connected through the solenoid valve 842 to the pressure line 834 and to the sump. The line 840 has interposed in it an oil filter 844 through which a portion of the oil returned to the sump 832 from this line passes, the filter being by-passed by a restricted line 846 which by-passes the remaining oil returning to the sump.

When the control circuit is activated a die return solenoid S6 of a self centering solenoid valve 848 is energized and this results in a plunger 850 of this solenoid valve moving to its dash-dot position (FIG. 26) with the result that low pressure oil in the line 834 is open to the face 234 (FIGS. 8, 10 and 26) of the piston 214, the face 232 of this piston being open to the sump 832. When this occurs the nailing die slide 88 is held under pressure at the forward end of its stroke. This feature is important because it sometimes happens that because of power failure or shutdowns in the factory the slide 88 and accordingly the nailing die 56 are not always in their forward positions at the time the machine is powered and the above construction insures that the nailing die and its associated nail driving mechanism are always at the heel attaching station 62 when the machine is operated through its cycle.

When the shoe 48 has been properly positioned in the machine the operator depresses the treadle 172 (FIGS. 1 and 9) against the action of the outer spring 178 causing the plunger 188 of the normally closed microswitch M2 (FIGS. 9 and 28) to be released and accordingly this microswitch to be closed by spring action. When the microswitch M2 has been closed the above-mentioned solenoid S1 (FIGS. 26 and 28) is energized thereby causing a plunger 852 (FIG. 26) of a solenoid valve 854 to be moved to its dash-line position shown in FIG. 26 and accordingly resulting in low pressure oil in the line 834 being available through the solenoid valve 852 and the line 164 (FIGS. 5, 6 and 26) for the face 168 of the piston 144 in the cylindrical housing 130, the face 170 of this piston being open through the line 166 to exhaust or the sump 832 with the result that the jack 54 is moved downward against the back cone of the last 50 and the heel seat portion 44 of the outsole 46 of the shoe 48 is forced against the base lift 42 positioned on the top of the rubber heel 40 in the heel ring 60. When the jack 54 has been lowered to clamp the work in the machine the microswitch M7 has opened thereby cutting off current from the mechanism for operating the heel ring 60 and the nailing die 56 as will appear later.

At the time that the treadle 172 is depressed sufficiently to close the microswitch M2 but not to close the microswitch M3, a plunger 856 of the first drive solenoid valve 842 is in its full-line position (FIG. 26), the solenoid S7 of this valve being deenergized and the maximum pressure relief valve 836 being to the pilot relief valve 832. It will thus be clear that the pressure exerted against the work in response to the closing of the microswitch M2 is low compared with the secondary or subsequent holddown pressure hereinafter referred to. During this stage of the operation the operator may remove his foot from the treadle 172 thereby deenergizing the solenoid S1 and resulting in the return of the jack 54 to its raised starting position.

When the operator is satisfied that the work has been properly positioned in the machine he further depresses the treadle 172 against the action of the outer spring 178 as well as against the action of the inner spring 179, initial depression of which constitutes a recognizable signal that further downward pressure cannot be exerted against the treadle without starting the machine through its heel attaching cycle. Upon further depression of the treadle 172 the striker 186 mounted on the treadle is lowered away from the plunger 190 of the normally closed microswitch M3 with the result that this microswitch is closed by spring action.

The closing of the microswitch M3 causes a coil K9 of a control relay to be energized with the result that normally open contacts K9–A, K9–B and K9–C of this relay are closed and normally closed contacts K9–D of this relay are opened. The closing of the contacts K9–B and K9–A establish holding lines for insuring that the relay coil K9 and the solenoid S1 shall remain energized when, as is customary, the operator removes his foot from the treadle immediately after depressing said treadle, and the closing of the contacts K9–C and the opening of the contacts K9–D sets up circuits for subsequent operations hereinafter referred to. It will be noted that when the relay coil K9 is energized the machine will automatically operate through its heel attaching cycle.

The energizing of the relay coil K9 and the opening of the relay contacts K9–D causes the solenoid S6 to be deenergized with the result that the plunger 850 of the solenoid valve 848, which is spring centralized, moves to its full-line position shown in FIG. 26 and accordingly lines 224, 226 leading to the cylinder 216 are sealed against flow of oil. The solenoid S6 is deenergized at this time to insure that the nailing die slide 88 shall not be subjected to high operating pressure and resultant stresses and shocks during the nail driving operation.

When the microswitch M3 is closed the solenoids S7 and S10 are also energized. The energizing of the solenoid S10 results in the heel transfer slide 506 moving, as above described, a heel from its position upon the supporting bed 496 and below the magazine 94 to a waiting position below the tamper 104 at the heel transfer station 96. As the transfer slide 506 leaves its rear or rest position the microswitch M10 closes and as this slide arrives at its forward position at the transfer station 96 the microswitch M11 closes, as above explained in connection with the initial loading of the machine, but since the microswitch M7 has already been opened by the lowering of the jack 54, no current is available at this time for the solenoids S5, S8 and S9.

When the solenoids S7 is energized the plunger 856 of the solenoid valve 842 is moved to its dash-line position (FIG. 26) thus causing the pilot relief valve 838 to be cut off from the maximum pressure relief valve 636 and this results in a pressure build-up in the line 834. As pressure builds up in the line 834 the holddown pressure against the face 168 of the piston 144, which is operatively connected to the jack, increases and a sequence valve 858 which is set to open up at about 400 lbs. per square inch for example is opened to render high pressure oil available for the face 340 (FIGS. 8 and 26) of the first drive piston or plunger 276, the face 350 of the plunger at this time being open to the sump 832. When this occurs the primary drivers 70 and secondary drivers 72 which are connected for initial movement with the primary drivers, as above explained, are raised together until such time that the drivers cause the associated nails to be brought into engagement with the work. At this time the face 333 of the second drive piston 328 is under the influence of exhaust oil at the line 166 which, because of resistance in the line, is at a pressure of approximately 30 pounds per square inch. This pressure on the face 333 assists in raising the piston 328 with the piston 276 as the secondary drivers are carried by the engagement of the spring-biased ball 356 with the notch 322 and thereafter to hold the secondary drivers with their nails against the work while the primary drivers are driving their nails. As the primary drivers 70 continue their upward movement to drive the associated nails into the work, the secondary drivers 72 remain at rest in engagement with their associated nails in engagement with the work. It will be noted that as the drivers 70, 72 are raised from their lowered positions the microswitch M8 is opened and further serves to insure that at that time no power is available for the heel transfer mechanism or for the slide 88 which carries the nailing die and its associated nail driving mechanism.

Just before the primary drivers 70 reach the upper ends of their strokes, determined by the engagement of the lower lip 282 of the sleeve 278 (FIGS. 7, 8, 10 and 11), with the stop face 300 of the drum 302, the striker 366 engages the plunger 368 of the microswitch M4 causing this microswitch to close and this results in energizing the solenoid S3.

The energizing of the solenoid S3 causes a plunger 860 of a solenoid valve 862, which includes said solenoid S3, to move to its dash-line position shown in FIG. 26 with the result that high pressure oil in the line 834 is available for the line 360 and accordingly for the face 333 of the inner piston 328 with the result that the secondary drivers 72 drive their associated nails into the work. Just before the upward movement of the drivers 72 is limited by the engagement of the upper end of the inner piston 328 with the shoulder 374 of the sleeve 278, which forms in effect part of the outer piston or plunger 276, the striker 372 engages the plunger 376 of the normally open microswitch M5 causing this switch to be closed. The closing of the microswitch M5 results in energizing the coil K11 of the control relay above referred to thereby opening normally closed contacts K11–A, K11–B and K11–C of this relay and closing normally open contacts K11–D, K11–E of this relay. The opening of the contacts K11–A, K11–B and K11–C of the general relay results in deenergizing the solenoids S1, S7, and S3 respectively. The closing of the relay contacts K11–D establishes a holding circuit for the relay coil K11 and the closing of the relay coil K11–E energizes a coil K15 of a control relay which will be hereinafter referred to and is used when heels are loaded into the machine by hand, the automatic heel feed at that time being turned off by moving the bridging member 798 of the selector heel loader switch M17 to its dash-line position.

When the solenoid S7 is deenergized the plunger 856 of the solenoid valve 842 returns to its full-line position (FIG. 26) allowing the operation of the pilot relief valve 838 to become effective again to lower the pressure in line 834 to approximately 200 lbs. per square inch.

The deenergizing of the solenoid S1 of the solenoid valve 852 results in the plunger of this valve returning to its full-line position shown in FIG. 26 with the result that oil under low and sump pressures is open to the faces 170, 168 respectively of the piston 144 and accordingly the jack is returned through the above described mechanism to its raised position and the microswitch M7 is again closed. The return of the plunger 852 of the solenoid valve 854 to its idle full-line setting, renders oil under low and sump pressures available for the faces 350, 340 respectively of the piston or plunger 276, which may also be referred to as a cylinder, causing said plunger to return to its lowered starting position, the microswitch M8 closing as the plunger arrives at its lowered position.

When the solenoid S3 of the solenoid valve 862 is deenergized the plunger 860 of this valve returns to its full-line position shown in FIG. 26, the face 333 of the inner piston 328 then being subjected to low pressure oil regulated by the setting of the pilot relief valve 838. As above explained the inner piston 328 is returned to its lowered position by downward pressure of the shoulder 374 of the plunger or cylinder 276 against the upper end of said inner piston, it being noted that upward force against the face 333 of the inner piston 328 tending to move the plunger 276 upward is offset by other surfaces of the plunger tending to move the plunger downward. Downward movement of the plunger 276 is limited, as above explained, by the engagement of the sleeve 278, which is secured to and forms part of the plunger, with the upper end of the cylindrical casing 272. Although the microswitches M7 and M8 are closed at substantially the same time it has been found that the microswitch M8 is closed just before the microswitch M7 is closed.

When the last of the microswitches M7 and M8 to close is closed a solenoid S5, the solenoid S8 and a coil K18 TD of a relay, which includes normally closed contacts K18–A TD and normally open contacts K18–B TD, are energized. The energizing of the solenoid S8 as above explained in connection with the initial loading of the rubber heel into the machine, causes the plunger 818 of the solenoid valve 816 to be moved by mechanism above described to its dash-line position (FIG. 27) with the result that the heel ring 60 is moved from the heel attaching station 62 to the heel transfer station 96. Movement of the heel ring 60 away from the heel attaching station results in the opening of the microswitch M13 and the arrival of the heel ring at the transfer station results in the closing of the microswitch M12.

When the microswitch M12 is closed by the arrival of the heel ring carriage 100 at the transfer station 96 the coils K21 TD and K22 of the above-mentioned time delay and control relays respectively are energized. As above explained, the relay including the coil K22 has contacts K22–A and K22–B which are closed when the coil is energized, the closing of the relay contacts K22–B setting up a holding circuit and the closing of the contacts K22–A resulting in the energizing of the tamper solenoid S9. When the solenoid S9 is energized the plunger 822 of the solenoid valve 820 is moved to its dash-line position causing air under low pressure to depress the piston 848 (FIGS. 21 and 27) against the action of the spring 652 whereby to transfer the rubber heel held in the transfer slide 506 into the heel ring 60 of the carriage 100 at the heel transfer station 96. After the relay coil K21 TD has been energized for a predetermined time sufficient to enable the rubber heel to be transferred from the transfer slide 506 to the heel ring 60 the contacts K21–A TD are opened thereby causing the solenoids S8 and S9 to be deenergized with the result that the tamper 104 returns to its raised starting position under the action of the spring 652 and the heel ring carriage 100 returns to the heel attaching position. Although the solenoids S8 and S9 are deenergized simultaneously it has been found that because of the biasing action of the spring 652, the tamper 104 moves away from the heel before the heel ring 60 starts its return movement to the heel attaching station 62.

When the heel ring 60 leaves the transfer station 96 the microswitch M12 opens and when said ring arrives at the heel attaching station 62 the microswitch M13 closes, the relay coil K23 receiving power through the holding line including the closed relay contacts K22–B, to energize the coil K23 with the result that the normally closed relay contacts K23–A, K23–B and K23–C are opened. The opening of the relay contacts K23–C causes the solenoid S10 to be deenergized and accordingly the transfer slide 506 to return to its rear starting position in which its gripper rolls 586 are arranged below the magazine 94. As the transfer slide 506 starts rearward the microswitch M11 is opened and when this slide reaches the rear end of its stroke the microswitch M10 is opened.

The energizing of the solenoid S5 by the closing of the microswitch M7, which, as above explained, closes just before the microswitch M8 closes, causes the plunger 850 of the solenoid valve 848 to be moved to its dash-line position (FIG. 26) with the result that low pressure oil is available for the face 232 (FIGS. 8, 10 and 11) of the piston 214, which operates the nailing die carrying slide 88, the face 234 of this piston being open to the sump 832. When this occurs the slide 88 moves rearward to a position in which the nailing die 56 carried by said slide is in a nail receiving position below the nail loader or tube holder 90. As explained in application Serial No. 278,869, during the latter part of the rearward movement of the slide 88 nails in an inverting bar 253 of the nail distributor are fed to the nail loader and accordingly to the nailing die which has a predetermined dwell at its rear or nail receiving position below the nail loader 90. As the nailing die carrying slide 88 starts away from its forward position the normally closed microswitch M6 closes the contacts K23–B and the microswitch M10 being closed at this time.

After the relay coil K18 TD has been energized for a predetermined period the normally closed and normally open contacts K18–A TD and K18–B TD respectively are opened and closed and accordingly the solenoids S5 and S6 are deenergized and energized respectively with the result that the plunger 850 of the solenoid valve 848 is moved to its dash-dot position causing the nailing die 56 and its associated nail driving mechanism carried by the slide 88 to return to their forward heel attaching positions. As the slide 88 reaches the forward end of its stroke the striker screw 262 (FIGS. 8 and 10) engages the plunger 264 of the microswitch M6 causing the switch to open.

The timing of the machine is such that the heel ring carriage 100 arrives at the heel attaching station 62 before the heel transfer slide 88 arrives at its heel receiving position below the magazine and that said slide arrives at its heel receiving position shortly before the nailing die 56 returns to the heel attaching station. Accordingly the contacts K23–B, the microswitch M10 and the microswitch M6 are opened in this order. With the above timing the operator usually has the base lift 42 positioned on the rubber heel 40 in the heel ring and is starting to present the shoe to the machine at the time that the nailing die 56 arrives at its heel attaching position.

When the microswitch M6 is opened in response to the return of the nailing die slide 88 to its forward position (the switch M10 and the relay contacts K23–B being open at this time and the operator having removed his foot from the treadle) the relay coil K9 is deenergized and accordingly the relay coils K11, K22, K23 and the time delay relay coils K18 TD and K21 TD are deenergized the machine being reset to its starting position. In view of the foregoing it will be clear that the microswitches M6 and M10 and the contacts K23–B must be opened before the control circuit will reset. Moreover it will also be noted that the relay coil K9 will remain energized so long as the operator retains the treadle depressed and accordingly until said treadle is released the machine cannot be recycled.

As above explained, when the machine is set for double drive the nail drive selector switch M16 is in its full-line position shown in (FIG. 28). When it is desired to single drive, the bridging member 802 (FIGS. 1 and 28) of this switch is manually operated to cause said member to be moved to and held in its dash-line position. With the machine set for single drive it will be clear that at the end of the first drive the relay coil K11 is energized in response to the closing of the microswitch M4 with the result that the outer piston 276 is immediately lowered to its retracted position and causes the connector member 320 to be lowered with it.

In order to render the automatic heel loader inactive the bridging member 798 of the switch M17 is moved from its full-line to its dash-line position (FIG. 28). With the bridging member 798 in its dash-line position the solenoid S10 cannot be energized and accordingly the automatic heel delivering mechanism above described cannot operate. It will be noted that in a line including contacts connected by the bridging member 798 in its dash-line position, is a coil K15 of a control relay which has normally closed contacts K15–A. When during the operation of the machine the nails have been driven into the work and the relay coil K11 is energized, the relay contacts K11–E are closed and the relay coil K15 is energized. This results in the contacts K15–A being opened thereby taking over the duty of the relay contacts K23–B (which are not operated because the automatic heel loader at this time is rendered inactive).

It is desirable that under some working conditions the nailing die 56 together with its associated nail driving mechanism shall remain at the heel attaching station 62 during the cycle of the machine, accordingly there is provided a nailing die cut out switch M19 having a bridging member 864 which may be manually moved selectively into and out of bridging relation with contacts of this switch. When the bridging member 864 does not bridge the contacts of the switch M19 the solenoid S5 cannot be energized and accordingly the nailing die slide 88 cannot move away from its forward heel attaching position.

It is also desirable that the nailing die 56, together with its associated nail driving mechanism, shall be power actuated but manually controlled for movement between their forward or heel attaching positions and their rearward or nail receiving positions independently of the cycle of the machine. With this in view there is provided a nailing die loading switch M18 comprising a plunger 866. When the machine is powered but idle the solenoid S6 is energized and the solenoid S5 is deenergized, the nailing die slide as above explained being held in its forward heel attaching position. When it is desired to "pick up" a load of nails independently of the cycle of the machine the plunger 866 is manually moved to its dash-line position (FIG. 28) with the result that the solenoids S5 and S6 are energized and deenergized respectively and accordingly the nailing die is moved by mechanism above disclosed to its nail receiving position beneath the nail loader 90. The operator retains the plunger 866 depressed until the nails are dumped into the passages 58 of the nailing die 56 and then releases said plunger which returns to its full-line position to cause the slide 88, which carries the nailing die and its associated nail driving mechanism, to move to its heel attaching position.

The independent moving of the nailing die between the heel attaching and nail receiving positions is desirable for several purposes. For example it sometimes happens that the machine fails to drive the full quota of nails into the heel and the heel seat portion of the shoe. When this happens the operator sets aside the defective shoe, opens the nail cut out switch M19 and moves the selector heel loader switch M17 to its dash-line position. The operator then attaches a heel to the next shoe in line and at the end of this cycle of the machine the nailing die 56 will not have any nails in its passages 58 and the heel ring 60 will be empty. Missing nails are than manually placed in the proper passages 58 of the nailing die 56, the nailing die cut off switch M19 is closed and the selector heel loader switch M17 is operated to its full-line position shown in FIG. 28. The defective shoe is thereafter presented to the machine and after actuating said machine through its cycle to drive the missing nails into the heel and the heel seat portion of the shoe, the shoe is removed from the machine which is now ready to continue to operate on the run of shoes in the conventional manner.

As above explained, the effective area of the face 168 (FIGS. 4 and 6) of the piston 144 is substantially greater than the effective area of the face 340 (FIG. 8) of the plunger 276 and is substantially greater than the effective area of the face 333 of the piston 328, thus insuring that the work shall be effectively held in position by the jack 54 during the driving of nails into the work. Furthermore, as above explained, the effective area of the face 340 of the plunger 276 is substantially greater than the effective area of the bottom 333 of the piston 328 and is sufficient to insure that during the driving operation of the drivers 72, the drivers 70 shall remain at the upper ends of their strokes in engagement with the nails that they have driven.

The supporting bed 496 of the heel handler 98 is initially adjusted to a predetermined elevation above the heel ring 60 at the transfer station 96, in accordance with the heights of the heels to be accommodated, by the use of the manually adjustable rod 490. In order to insure that the supporting bed 496 shall not interfere with heels which may be improperly pressed into the heel ring 60, during movement of said ring toward the heel attaching station 62, the bottom surface of the supporting bed 496 adjacent to the opening 498 is provided with a cam or wiper surface 868.

Having thus described our invention, what we claim as new and desire to secure by Letters Patent of the United States is:

1. In a machine for attaching a heel to the heel seat portion of a shoe, a primary set of nail drivers, a secondary set of nail drivers, means for causing said sets of drivers to drive sets of nails respectively in succession into the heel and the heel seat of the shoe whereby to attach the heel to the shoe, and means for causing the secondary drivers to force their associated set of nails against the work and to hold them there against movement as the primary drivers drive their associated set of nails into the work.

2. In a heel attaching machine, means for clamping together a heel and a heel seat portion of a shoe, a primary set of nail drivers, a secondary set of nail drivers, fluid pressure means which comprises a first piston having formed in it a bore and which is cooperative with the primary set of drivers to drive an associated set of nails into the heel and the heel seat of the shoe, fluid pressure means which comprises a second piston slidable in the bore of said first piston and which is cooperative with the second set of drivers whereby to drive an associated set of nails into the heel and the heel seat of the shoe, and means for causing the secondary drivers to force their associated set of nails against the work and to hold them there against movement as the primary drivers drive their associated set of nails into the work.

3. In a heel attaching machine, a movable piston, a housing coupled for movement with the piston, a nailing die having passages, a driver head movable with the housing and having secured to it drivers which are slidable in the passages of the nailing die, fluid pressure operated means cooperating with the nailing die for clamping together a heel and a heel seat of a shoe, fluid pressure operated means for moving the piston in one direction to cause the housing to move the drivers in one direction and accordingly to drive nails in the passages of the nailing die into the heel and the heel seat of the shoe, a stop for limiting movement of the piston in said one direction, a striker secured to the coupling housing, means for initially adjusting the stop lengthwise of said one direction of movement of the piston, a switch initially adjustable in response to adjustment of the stop, and means responsive to operation of the switch by the striker just before movement of the piston in said one direction is limited by the stop for causing said second-named fluid pressure operated means to move the piston and accordingly the housing and the drivers with it in a direction opposite to said one direction.

4. In a heel attaching machine, a movable piston, a housing coupled for movement with the piston, a nailing die having passages, a driver head movable with the housing and having secured to it drivers which are slidable in the passages of the nailing die, fluid pressure operated means cooperating with the nailing die for clamping together a heel and a heel seat of a shoe at a heel attaching station, fluid pressure operated means for moving the piston in one direction to cause the housing to move the drivers in one direction and to drive nails in said passages of the nailing die into the heel and the heel seat of the shoe, a stop for limiting movement of the piston in said one direction, a striker secured to the coupling housing, means for initially adjusting the stop in said one direction of movement of the piston, a switch initially adjustable in response to adjustment of the stop, means responsive to the operation of the switch by the striker just before movement of the piston in said one direction has been limited by the stop for causing said second-named fluid pressure operated means to move the piston and accordingly the housing and the drivers with it in a direction opposite to said one direction, a nail loader spaced from the heel attaching station, and fluid pressure operated means for moving the nailing die, the coupling housing and the drivers as a unit between positions in which the nailing die is arranged at the heel attaching station and the piston is coupled to the housing and in which the nailing die is arranged opposite the nail loader.

5. In a heel attaching machine, a movable piston, a housing coupled for movement with the piston, a nailing die having passages, a driver head movable with the housing and having secure to it drivers which are slidable in the passages of the nailing die, fluid pressure operated means cooperating with the nailing die for clamping together a heel and a heel seat of a shoe at a heel attaching station, fluid pressure means for moving the piston in one direction to cause the housing to move the drivers in one direction and to drive nails in said passages of the nailing die into the heel and the heel seat of the shoe, a stop for limiting movement of the piston in said one direction, a striker secured to the coupling housing, means for initially adjusting the stop in said one direction of movement of the piston, a switch initially adjustable in response to adjustment of the stop, means responsive to the operation of the switch by the striker just before movement of the piston in said one direction has been limited by the stop for causing said second-named fluid pressure means to move the piston and accordingly the housing and the drivers with it in a direction opposite to said one direction, a nail loader spaced from the heel attaching station, fluid pressure operated means for moving the nailing die, the coupling housing and the drivers as a unit between positions in which the nailing die is arranged at the heel attaching station and the piston is coupled to the housing and in which the nailing die is arranged opposite the nail loader, said first, second and third-named fluid pressure operated means being automatically operated in timed relation, manually controlled means for independently operating the third-named fluid pressure means in order to supply a load of nails to the machine without operating the machine through its heel attaching cycle, and manually controlled means for rendering said third-named fluid pressure means inactive during the heel attaching cycle of the machine.

6. In a heel attaching machine, a cylindrical housing having a bore, a piston slidable in said bore, a nailing die having passages, drivers movable in the passages of the nailing die, a holddown, fluid pressure operated means for effecting relative movement between the holddown and the nailing die to cause a heel and a heel seat of a shoe to be clamped together, fluid pressure operated means for moving said piston from a retracted position first in one direction in said bore to cause the drivers to drive nails into the heel and the heel seat of the shoe and then back to the retracted position, a stop which is threaded onto the housing and is adapted to be engaged by the piston as it moves in said one direction to limit movement thereof and which is adjustable on the housing to vary the position of said stop and accordingly the extent of drive of the piston, and means operative at the time when the piston engages the stop for rendering said fluid pressure operated means active to cause the piston together with the drivers to be moved back to their retracted positions.

7. In a heel attaching machine, a slide comprising a pair of guide rods, a loader block secured to the slide and having a plurality of passages, means for moving the slide between two different operating positions in which the nailing die is arranged at heel attaching and nail receiving stations respectively, means for securing work against the nailing die when said die is in its heel attaching position, a coupling beam supported by the slide and slidingly mounted for movement along the guide rods, said coupling beam having guideways, first drivers which are secured to the coupling beam for movement therewith and register in associated passages of the nailing die, a connector member movable along the guideways of the coupling beam, second drivers which are secured to the connector member and register in associated passages of the nailing die, an outer driver member, an inner driver member, said coupling beam and said outer driving member having interlocking portions for coupling said beam and said outer driving member for heightwise movement as a unit when the nailing die secured to the slide is at the heel attaching station, means for yieldingly mounting the connector member in a predetermined position on the coupling beam, fluid pressure operated mechanism for moving the outer drive member toward the nailing die to cause the coupling beam together with the connector member in said predetermined position in said beam to move as a unit toward the nailing die whereby to cause nails in said passages of the nailing die to be forced against said work secured to the nailing die and for thereafter causing said first drivers to drive nails in their associated passages into the work while said means for yieldingly mounting the connector member on said coupling beam allows said connector member to remain idle, and fluid pressure means for thereafter causing said inner driving member to move with relation to the coupling beam the connector member toward the nailing die whereby to cause said second drivers to drive nails in their associated passages into the work while said first drivers remain at rest.

8. In a heel attaching machine, a nailing die, means comprising a holddown for clamping together a heel seat portion of a shoe and a heel adjacent to said nailing die, a primary driver head, a secondary driver head, a set of primary drivers which are secured to said primary driver head and are slidingly mounted in some of the passages of the nailing die, a set of secondary drivers which are secured to said secondary driver head and are slidingly mounted in other passages of the nailing die, a carrier, means for securing the primary driver head to the carrier, means comprising a connector member for holding the secondary driver head in a predetermined position on the carrier but for yieldingly allowing movement of the carrier and accordingly the primary driver head toward and away from the nailing die with relation to the secondary driver head, a first piston which has a bore and to which the carrier is coupled for movement toward and away from the nailing die, a second piston which is in register with the connector member and which is movable in the bore of said first piston, fluid pressure means for moving the first piston and the second piston toward the nailing die and for causing the carrier to move the primary and secondary driver heads toward the nailing die whereby to cause the primary and secondary drivers to force nails in associated passages of the nailing die against the heel in forced engagement with the heel seat portion of the shoe and for thereafter causing the primary drivers to drive nails into the heel and the heel seat portion of the shoe, said secondary driver head yielding with relation to the carrier but causing nails engaged by the secondary drivers to be held in engagement with the heel, and fluid pressure means for causing the second piston substantially to engage the connector member associated with the secondary driver head as the connector member moves with the carrier and while the carrier is moved with relation to the secondary driver head, said second-named fluid pressure means also being operative, after the primary set of nails have been driven into the heel and the heel seat portion of the shoe, to move with relation to the carrier, the piston, the connector member and the secondary driver head toward the nailing die whereby to cause the secondary set of drivers to drive nails in associated passages of the nailing die into the heel and the heel seat portion of the shoe.

9. In a heel attaching machine having an automatic operating cycle, the combination of a magazine, a nailing die, a transfer station spaced from the magazine and from the nailing die, a form for carrying a heel, power operated means for moving the form between a predetermined position adjacent to the nailing die and a predetermined position at the transfer station, power operated means which comprises a presser member and is actuated in timed relation with said first-named means and is adapted to receive a heel from the magazine and to deliver it to the form at the transfer station, said presser member being movable between an active position in which it cooperates with said second-named means to deliver the heel to the form and a position in which it facilitates access to the magazine, and means for insuring against operation of said last mentioned power operated means when the presser member is in its inactive position.

10. In a heel attaching machine, a magazine having a door, a nailing die, a transfer station spaced from the magazine and from the nailing die, a heel carrying form, power operated means for moving the form between a predetermined position adjacent to the nailing die and a predetermined position at the transfer station, power operated means adapted to receive a heel from the magazine and to deliver it to a predetermined position adjacent to the heel form positioned at the transfer station, power operated means which comprises a tamper arranged in an active position in front of the door of the magazine and which is adapted to force the heel in said second-named means into the form at the transfer station, manually operated means for moving said tamper to an inactive position to facilitate opening the door of the magazine preparatory to loading heels into the magazine, means for operating said first and second-named power operated means in timed relation, and means for insuring against actuation of said power operated means when the tamper is in its inactive position.

11. In a heel attaching machine, a magazine having a door, a nailing die, a transfer station spaced from the magazine and from the nailing die, a heel carrying form, power operated means for moving the form between a predetermined position adjacent to the nailing die and a predetermined position at the transfer station, power operated means adapted to receive a heel from the magazine and to deliver it to a predetermined position adjacent to the heel form positioned at the transfer station, power operated means which comprises a tamper arranged in an active position in front of the door of the magazine and which is adapted to force the heel in said second-named means into the form at the transfer station, manually operated means for moving said tamper to an inactive position to facilitate opening the door of the magazine preparatory to loading heels into the magazine, means for operating said first and second-named power operated means in timed relation, and means for insuring against actuation of said power operated means when the tamper is in its inactive position, and means responsive to the moving of the tamper to its active position for initiating movement of the first and second-named power operated means through a cycle to cause said means automatically to deliver a heel from the magazine to a position adjacent to the nailing die.

12. In a heel attaching machine, power operated means which comprises a nailing die and associated drivers for attaching at a heeling attaching station a heel to a shoe, a nail loader to which nails are delivered, power operated means for automatically moving in timed relation with said first-named means the die and the drivers from said heel attaching station to said nail loader and after a dwell at the nail loader returning the die and the drivers to the heel attaching station, and manually actuated means for rendering said last mentioned power operated means inactive while the first-named power operated means remains active.

13. In a heel attaching machine, power operated means, which comprises a nailing die and associated drivers, for attaching at a heel attaching station a heel to a shoe, a nail receiving station to which nails are delivered, power operated means for automatically moving in timed relation with said first-named means the die and the drivers from said heel attaching station to said nail receiving station and for returning them to the heel attaching station, said first and second-named power means being operated automatically in timed relation during a heel attaching cycle of the machine, and means for independently rendering said second-named means active to cause the nailing die to receive a load of nails at the nail receiving station without operating the machine through its heel attaching cycle without actuating the first-named power actuated means.

14. In a heel attaching machine having an automatic operating cycle, the combination of power operated means, which comprises a nailing die and associated drivers, for attaching at a heel attaching station a heel to a shoe, a nail receiving station to which nails are delivered, power operated means for automatically moving in timed relation with said first-named means the die and the drivers from said heel attaching station to said nail receiving station and for returning them to the heel attaching station, said first and second-named power means being operated automatically in timed relation during a heel attaching cycle of the machine, means for independently rendering said second-named means active to cause the nailing die to receive a load of nails at the nail receiving station without operating the machine through its heel attaching cycle, and means for rendering said second-named power operated means inactive while the first-named power operated means operates through an otherwise normal automatic cycle.

15. In a heel attaching machine having an automatic operating cycle, the combination of fluid pressure operated means which includes a nailing die having passages for forcing together a heel seat portion of a shoe and a heel, fluid pressure operated means including drivers movable in the passages of the nailing die for driving nails into the heel seat of the shoe and the heel whereby to attach the heel to the shoe, a nail receiving station to which nails are fed, fluid pressure operated means which is operated automatically during the power cycle of the machine in time relation with the first and second-named fluid pressure operated means for moving the nailing die and the drivers between a heel attaching station where the die and the drivers serve to attach the heel to the shoe and the nail receiving position where nails are delivered to the passages of the nailing die, and means for selectively rendering said third-named fluid pressure operated means inactive to retain the nailing die and the drivers against movement away from their heel attaching position while operating the machine through an otherwise normal automatic cycle.

16. In a heel attaching machine having an automatic operating cycle, the combination of fluid pressure operated means, which includes a nailing die having passages, for forcing together a heel seat portion of a shoe and a heel, fluid pressure operated means including drivers movable in the passages of the nailing die for driving nails at a heel attaching station into the heel seat of the shoe and the heel whereby to attach the heel to the shoe, a nail receiving station to which nails are fed, fluid pressure operated means which is operated automatically in time relation with the first and second-named fluid pressure operated means for moving the nailing die and the drivers between the heel attaching station and the nail receiving station where nails are delivered to the passages of the nailing die, means for selectively rendering said third-named fluid pressure operated means inactive to retain the nailing die and the drivers against movement away from the heel attaching station while the machine is operated through its heel attaching cycle, and means for selectively rendering the third-named fluid pressure operated means active, independently of the first and second-named fluid pressure means, to move the nailing die and the associated drivers from the heel attaching station to the nail receiving station and back to said heel attaching station without operating the heel clamping and nail driving instrumentalities of the machine through a normal automatic cycle.

17. In a heel attaching machine having an automatic operating cycle, the combination of fluid pressure operated means which includes a nailing die having passages, for forcing together a heel seat portion of a shoe and a heel, fluid pressure operated means including drivers movable in the passages of the nailing die for driving nails into the heel seat of the shoe and the heel whereby to attach the heel to the shoe, a nail receiving station to which nails are fed, fluid pressure operated means which is operated automatically in time relation with the first and second-named fluid pressure operated means for moving the nailing die and the drivers between a heel attaching station where the die and the drivers serve to attach the heel to the shoe and the nail receiving station where nails are delivered to the passages of the nailing die, and means for selectively rendering the third-named fluid pressure operated means active, independently of the first and second-named fluid pressure means, to move the nailing die and the associated drivers from the heel attaching station to the nail receiving station and back to said heel attaching station without operating the heel clamping and nail driving instrumentalities of the machine through a normal automatic cycle.

18. In a heel attaching machine, a magazine comprising a fixed rear section adapted to be engaged by the rear ends of a stack of heels, a pair of forward sections adapted to be engaged by the side faces of the heels, and manually operated means for moving said forward sections as entireties equal distances toward each other and toward the rear section for causing the rear ends of the stack of heels to engage said rear section and accordingly to cause said heels to be oriented in stacked relation in the magazine.

19. In a heel attaching machine, a magazine for heels, said magazine comprising a fixed rear section adapted to be engaged by the rear ends of a stack of heels, movable sections adapted to be engaged by the side faces of the stack of heels, and manually operated means for initially moving with relation to said rear section said movable sections bodily along graduated paths which converge as they approach the rear section.

20. In a heel attaching machine, a magazine comprising a fixed rear section adapted to be engaged by the rear ends of heels arranged in stack relation, movable side sections, manually operated means for initially moving into different positions said side sections as entireties equal distances toward and away from each other as they are moved respectively toward and away from the rear section whereby to engage the sides of the heels, and a door which is hinged to one of said side sections and is slidable relative to the other of said side sections and is adapted roughly to align the breasts of the heels in the magazine.

21. In a heel attaching machine, a heel handler including a magazine comprising a fixed rear portion and a pair of initially adjustable front portions, a plate fixed to the rear portion of the magazine and having formed in it camways, follower means operatively connected to the front portions respectively of the magazine to cause each of said front portions to be moved an equal distance relatively to said fixed rear portion when either front portion is moved whereby to measure heels in the magazine lengthwise and widthwise, and manually operated means for setting the front portions of the magazine in their measuring positions in which the lengthwise and widthwise cross sectional dimensions of the magazine are just slightly greater than lengthwise and widthwise cross sectional dimensions of heels stacked in said magazine.

22. In a heel attaching machine, a heel handler including a magazine comprising a fixed rear end portion and a pair of movable front portions, and means for adjusting the front portions of the magazine into different adjusted positions equal distances toward and away from each other and together toward and away from the fixed rear end portion of the magazine to measure heels stacked in the magazine lengthwise and widthwise and to set the magazine so that its lengthwise and widthwise dimensions are just slightly greater than the lengthwise and widthwise dimensions respectively of the heels.

23. In a heel attaching machine, a heel handler including a magazine having a heightwise median plane and comprising a fixed rear end portion and side and front portions, means for effecting adjustment of the side and front portions transversely and lengthwise of said median plane in accordance with the graded widthwise and lengthwise measurements respectively of heels of different sizes whereby to cause the effective widthwise and lengthwise dimensions of the magazine to be slightly greater than the widthwise and lengthwise measurements of the heels being measured.

24. In a heel attaching machine, a heel handler comprising a magazine having a heightwise median plane and including a fixed rear end portion, movable side portions and a front portion carried by one of the side portions, means comprising cams for effecting adjustments of one of said side portions and its associated front portion on the one hand and the other side portion on the other hand to establish between said side portions and heels of different sizes points of engagement coinciding with graded angles to said plane, and manually actuated means for effecting adjustment of said side portions and said front portion until the side portions engage opposite side portions of the heel and the front portion forces the rear ends of the heels into substantial engagement with the fixed rear end portion.

25. In a heel attaching machine, a heel handler including a heel receiving magazine, manually operated means for varying the length and the width of the cross-section of said magazine, a slide which comprises grippers and which is movable to and from a heel receiving position beneath the magazine, and means for opening up the grippers to an extent depending upon the setting of the magazine as the slide arrives beneath the magazine.

26. In a heel attaching machine, a magazine comprising a fixed rear housing portion, opposite side housing portions, a door which is journaled to one of the side housing portions and is latched to the other of said housing portions, and manually operated means for adjusting said side housing portions at some time toward each other and toward the rear housing portion and for at other times adjusting said side housing portions simultaneously away from each other and away from the rear housing portion whereby roughly to align a stack of heels in the magazine.

27. In a heel attaching machine, a nailing die, a magazine for receiving in stacked relation a plurality of heels, a table beneath the magazine, a heel carrying form, fluid pressure operated means for moving the form between the nailing die and a transfer station, fluid pressure means comprising a pair of grippers for delivering a heel, which is dropped from the magazine onto the table, to the transfer station, means for varying the cross sectional shape of the magazine and for varying the starting positions of the grippers in accordance with the size of the heel in the magazine, a presser member, and fluid pressure operated means for causing the presser member to force a heel at the transfer station into the form at this station.

28. In a heel attaching machine, a magazine for receiving in stacked relation a plurality of heels, a supporting bed arranged beneath the magazine, a station which is spaced from the magazine, fluid pressure means comprising a pair of grippers for delivering a heel, which is dropped from the magazine onto the supporting bed, to said station, and means for varying the cross-sectional shape of the magazine and for varying the starting positions of the grippers in accordance with the measured size of the heel in the magazine.

29. In a heel attaching machine, a magazine, a heel form, a nailing die, means for moving said form between a transfer station located a substantial distance from the die and a heel attaching station adjacent to said die, means comprising a slide and a pair of jaws adapted successively to receive heels from the magazine and to deliver them to said transfer station, said slide and said jaws having rolls adapted to be engaged respectively by the rear end of the heel and by the forward end portions of the side margins of the heel, means for moving the jaws toward each other to cause the heels to be initially oriented and gripped as said slide and jaws move toward the transfer station, means for initially varying the cross sectional shape of the magazine in accordance with the size of the heels to be accommodated by said magazine, means responsive to the setting of said last-named means for varying the starting positions of the jaws whereby to insure that the jaws grip the forward side portions of the heel immediately as they start forward irrespective of the size of the heel, and a presser foot for forcing the oriented heel into said form at the transfer station preparatory to moving the form to the heel attaching station.

30. In a heel attaching machine, a magazine adapted to receive heels in stacked relation, a nailing die, a transfer station spaced from the magazine and from the nailing die, a form having a cavity for receiving a heel, power operated means for moving the form between a predetermined operating position adjacent to the nailing die and a predetermined position at the transfer station, power operated means adapted to orient and to grip a heel, which is received from the magazine, by engagement with the side and rear faces of the heel and to deliver the heel to a predetermined position at the transfer station, means comprising a member which is manually moved initially and is adapted to change the cross sectional shape of the magazine and the setting of the power operated heel orienting and gripping means in accordance with the size of the heels being accommodated, means adapted yieldingly to engage the breast of the heel as it arrives at the transfer station to insure that the heel shall not be displaced from its position in said second-named power operated means when the slide is stopped at said transfer station, power operated means for engaging the upper face of the heel to move said oriented heel into the cavity of said form preparatory to moving said form to said operating position adjacent to the nailing die, and means for operating the first, second and third-named power operated means in timed relation.

31. In a heel attaching machine, a heel handler including a multipart magazine adapted to receive heels in stacked relation, means for relatively adjusting parts of the magazine to adapt it to accommodate and to position in stacked relation heels of different sizes, a transfer slide movable to and from a heel receiving position below the magazine and adapted to deliver heels dropped from said magazine to a predetermined position spaced from the magazine, an adjusting plate operatively connected to the magazine, means for setting the adjusting plate in different operating positions in accordance with the relative adjustment of the parts of the magazine, said transfer slide comprising a pair of grippers which are adjustably mounted on the slide and are adapted to engage opposite forward sides respectively of heels and to cooperate with the slide to hold and position on the slide heels received from the magazine, and means movable with the grippers and adapted to engage the adjusting plate to position the grippers on the transfer slide in accordance with the setting of the adjusting plate.

32. In a heel attaching machine, a heel handler comprising a supporting bed having guideways, a magazine which has a plurality of heel engaging sections and is mounted on said bed, a heel carrier slide which is mounted for movement in one of said guideways and has a front opening and which includes a pair of rear rolls rotatably mounted on the slide and arranged at the rear end of said opening and a pair of grippers which are bodily movable equal distances transversely and longitudinally of the slide toward and away from each other, means for moving the heel carrier slide between a heel receiving position in which its front opening is arranged below the magazine to receive a heel which is dropped from the magazine onto the supporting bed and a predetermined heel delivering position, manually actuated means which is initially moved to a predetermined setting for relatively adjusting parts of the magazine with relation to other parts whereby accurately to position heels of different sizes in the magazine so that they shall drop in predetermined positions on the supporting bed, and means responsive to setting of said manually actuated means for causing near the end of movement of the slide to its heel receiving position the gripper rolls to be moved away from each other equal distances which vary in accordance with the size of the heel to be accommodated, said gripper rolls, as the carrier slide moves forward with the rear rolls in engagement with the rear end of the heel, being adapted immediately to close in against the forward portions of the sides of the heel and to cooperate with the rear rolls mounted on the slide in the positioning of the heel on the slide and in maintaining it in this position.

33. In a heel attaching machine, a heel handler comprising a supporting bed, a magazine mounted on said bed, a heel carrier slide which is movable on said bed between a heel receiving position beneath the magazine and a heel delivering position remote from said magazine, said slide comprising abutments adapted to be forced against the rear end of the heel on the supporting bed as the side moves from its heel receiving position, grippers mounted for movement on the slide, spring means for constantly urging the grippers toward each other, and means for moving just before the carrier slide reaches its heel receiving position the grippers away from each other a measured distance which is variable and is dependent upon the size of the heel accommodated.

34. In a heel attaching machine, a magazine, a carrier slide, said magazine and carrier slide having a common heightwise median plane, rear rolls which are pivoted on the carrier slide adjacent to and at opposite sides respectively of said plane, a pair of jaws which are pivotally mounted on the slide and are movable toward and away from said rear rolls and are constantly urged by spring action toward the rolls, a nailing die, a heel form movable between a heel attaching station adjacent to the nailing die and a transfer station which is spaced from the magazine and from said die, a supporting bed arranged beneath the magazine and adapted to guide the carrier slide, means for moving on said bed the slide between a heel receiving position below the magazine and a heel delivering position at the transfer station, means responsive to movement of the slide toward its heel receiving position for opening said jaws whereby to allow one of the heels in the magazine to drop onto the supporting bed between the jaws, said jaws during the first part of their movement toward the transfer station being closed against the heel to grip the heel whereby to move the heel to the transfer station, and heel measuring means for modifying the operation of the second-named means to vary the amount that the jaws open thus insuring that irrespective of the size of the heel the distance between the jaws shall be just slightly greater than the width of the forward part of the heel to be accommodated.

35. In a heel attaching machine, a fixed supporting bed having a U-shaped opening, a vertical median plane bisecting said opening, and pairs of guideways extending lengthwise of said opening, a top plate secured fixedly to said supporting bed and having a U-shaped opening which is bisected by said median plane and is offset lengthwise of said guideways from the U-shaped opening of the supporting bed, a heel receiving magazine which is supported by said top plate and comprises a rear section rigidly secured to said top plate, side sections which are movable upon said top plate and a door journalled on one of the side sections and latched to the other side section, said top plate having a pair of graded camways which are arranged equidistant at opposite sides of said plane and which converge as they extend rearwardly of the U-shaped opening of the top plate, cam followers which are secured to the side sections of the magazine and are slidable in said camways and which have studs secured to them, an adjusting plate slidable in one of said pairs of guideways in the supporting bed and having formed in it a pair of slots which extend toward and away from said plane and in which the studs respectively of the cam followers slidingly fit, means for securing the adjusting plate to the top plate and for releasing it for movement in its associated guideways with relation to the top plate, and means for effecting an initial adjustment of the adjusting plate into different operating positions lengthwise of its associated guideways to cause one side section and the door of the magazine on the one hand and the other side section of the magazine on the other hand guided by said graded camways to be moved against the heels stacked in the magazine for forcing their rear ends against the rear section of the magazine, the construction and arrangement being such that the rear side and breast faces of the heel are in substantial contact with the rear section, the side sections and the door of the magazine whereby to cause the magazine accurately to position said heels.

36. In a heel attaching machine, a fixed supporting bed having a U-shaped opening, a vertical median plane bisecting said opening and pairs of guideways extending lengthwise of said opening, a top plate secured fixedly to said supporting bed and having a U-shaped opening which is bisected by said median plane and is offset lengthwise of said guideways from the U-shaped opening of the supporting bed, a heel receiving magazine which is supported by said top plate and comprises a rear section rigidly sesured to said top plate, side sections which are movable upon said top plate and a door journalled on one of the side sections and latched to the other side section, said top plate having a pair of graded camways which are arranged equidistant at opposite sides of said plane and which converge as they extend rearwardly of the U-shaped opening of the top plate, cam followers which are secured to the side sections of the magazine and are slidable in said camways and which have studs secured to them, an adjusting plate slidable in one of said pairs of guideways in the supporting bed and having formed in it a pair of slots which extend toward and away from said plane and in which the studs respectively of the cam follower slidingly fit, means for securing the adjusting plate to the top plate and for releasing it for movement in its associated guideways with relation to the top plate, means for effecting an initial adjustment of the adjusting plate into different operating positions lengthwise of its associated guideways to cause one side section and the door of the magazine on the one hand and the other side section of the magazine on the other hand guided by said graded camways to be moved against the heels stacked in the magazine for forcing their rear ends against the rear section of the magazine, the construction and arrangement being such that the rear, side and breast faces of the heel are in substantial contact with the rear section, the side sections and the door of the magazine whereby to cause the magazine accurately to position said heels, a carrier slide slidable in the other pair of guideways in the supporting bed and comprising a U-shaped opening bisected by the heightwise median plane, a pair of depending rolls which are mounted on the carrier slide and are arranged at the rear end of the opening of said slide at opposite sides of said plane and are adapted to engage, as the slide moves forwardly, a heel dropped from the magazine onto the supporting bed, and a pair of camways which are formed in the carrier slide and are arranged equidistant the opposite sides of the U-shaped opening of the slide and are disposed in generally parallel relation to the camways respectively formed in the top plate, cam followers which are slidable along the camways of the carrier slide respectively and have mounted on them gripper rolls and upstanding studs, springs opposite ends of which are attached to the cam followers and to the carrier slide and which are adapted constantly to urge the cam followers rearwardly in the associated camways in the carrier slide, and means for moving the carrier slide between a heel receiving position in which the U-shaped opening in the slide is arranged below the magazine and below the U-shaped opening in the top plate and a heel delivering position in which the U-shaped opening in the slide is arranged above the U-shaped opening in the supporting bed, said studs on the cam followers which carry the gripper rolls respectively, just before the slide reaches its heel receiving position, being adapted to engage the magazine adjusting plate whereby to cause said gripper rolls to move away from each other to an extent determined by the setting of the adjusting plate.

37. In a heel attaching machine having an automatic operating cycle, the combination of a nailing die having passages, nail drivers movable in the passages of the nailing die, fluid pressure operated means for clamping a positioned shoe on a last with relation to the nailing die at a heel attaching station, fluid pressure operated means for moving the nailing die and the drivers between the heel attaching station and a nail loading position where nails are delivered to the passages of the die and onto the drivers, and means responsive to the powering of the machine for rendering said second-named fluid pressure operated means immediately active to cause said die and said drivers to move to the heel attaching station at the start of the cycle in the event that they are not already at said station.

38. In a heel attaching machine, a heel handler comprising a supporting bed which has substantially horizontal guideways and has at its forward end an opening arranged at a transfer station, a heel transfer slide which is mounted for movement along said guideways and is adapted to deliver a heel resting on the supporting bed to a waiting position above the opening of the supporting bed, a heel ring, means for moving the heel ring between a heel attaching station and a heel receiving position below the opening of the supporting bed at the transfer station, means for depressing the heel, which is held by the transfer slide in its waiting position, through the opening in the supporting bed and into the heel ring, and means for initially moving the supporting bed into different operating positions toward and away from the heel ring at the transfer station to accommodate heels of different heights.

39. In a heel attaching machine, a heel handler comprising a supporting bed which has substantially horizontal guideways and has at its forward end an opening arranged at a transfer station, a heel transfer slide which is mounted for movement along said guideways and is adapted to deliver a heel resting on the supporting bed to a waiting position above the opening of the supporting bed, a heel ring, means for moving the heel ring between a heel attaching station and a heel receiving position at the transfer station and below the opening of the supporting bed, means for depressing the heel, which is held by the slide in its waiting position, through the opening in the supporting bed and into the heel ring, and means for initially moving the supporting bed into different operating positions toward and away from the heel ring at the transfer station to accommodate heels of different heights, said supporting bed having formed at its bottom face adjacent to one side of the opening a cam surface which, if portions of the heels are not properly positioned in the heel ring, is adapted to be engaged by said portions to facilitate the pressing of said portions into the heel ring as said ring moves toward the heel attaching station.

40. In a heel attaching machine having an automatic operating cycle, the combination of a nailing die having passages, fluid pressure operated means for moving during a cycle of the machine the nailing die between a loading position, where nails are delivered to the passages of the die, and a heel attaching position where a heel is attached to a shoe, and means for controlling the operation of said fluid pressure operated means, said last-named means being adapted to insure that the machine, when powered, will recycle only in response to the nailing die having been moved to its heel attaching position.

41. In a heel attaching machine having an automatic operating cycle, the combination of a nailing die having passages, fluid pressure operated means for moving during a cycle of the machine the nailing die between a loading station, where nails are delivered to passages of the die, and a heel attaching station where a heel is attached to a shoe, a heel ring for holding and positioning a heel, fluid pressure operated means for moving said heel ring between a heel receiving station and the heel attaching station, and means for controlling the operation of said first and second-named fluid pressure operated means, said last-named means being adapted to insure that the machine, when powered, will recycle only in response to both the nailing die and the heel ring having been moved to the heel attaching station.

42. In a heel attaching machine, a fixed frame, a door mounted on said frame for movement between closed and open positions, a back gage for positioning the rear ends of shoes, a forepart gage comprising a platform which is fixedly secured to the door and a pair of upstanding arms which are mounted on the platform and are adapted to be engaged respectively by the inner ends of the break lines of outsoles of right and left shoes and which cooperate with the back gage in the positioning of the shoes in the machine, means for moving on said platform said arms into different operating positions lengthwise and widthwise of the shoes, and means for swinging one of the arms to an inactive position toward the other arm to insure against contact of said one arm with portions of the machine when the door is opened.

43. In a heel attaching machine, a heel ring adapted to position a rubber heel, and a base lift gage which is adapted to position a base lift upon the rubber heel in said ring, said base lift gage comprising a fixed base block, a bearing rod which has an axis and a circumferential groove and which is journaled on the base block for movement about said axis, a guide block which has guideways and is mounted on said bearing rod and which has a spline portion engaging in said circumferential groove of said rod, a composite carrier slide which is movable into different adjusted positions along the guideways of the guide block, base lift positioning arms pivotally mounted on the carrier slide, means for constraining said arms for equal movement in opposite directions toward and away from each other, a spring for constantly urging said arms toward each other, means responsive to rotation of the bearing rod on the base block for initially moving the bearing rod into different operating axial positions on the base block whereby to move widthwise of the heel ring the guide block, the carrier slide and the centralizing arms as an entirety, means for initially moving the guide block into different adjusted positions about said bearing rod to vary the heightwise operating positions of the centralizing arms above the heel ring, means for initially varying the positions of the centralizing arms toward and away from each other to accommodate heels of different sizes, and means for initially adjusting the carrier slide along said guideways of the guide block to vary the positions of the centralizing arms lengthwise of the heel ring.

References Cited by the Examiner
UNITED STATES PATENTS

| | | | |
|---|---|---|---|
| 1,000,534 | 8/1911 | Mayo | 1—138 |
| 1,157,688 | 10/1915 | Glidden | 1—139 |
| 2,391,543 | 12/1945 | Carr et al. | 1—338 X |
| 2,746,048 | 5/1956 | Cutler et al. | 1—339 X |
| 2,900,637 | 8/1959 | Schafroth | 1—44.4 X |
| 2,994,882 | 8/1961 | MacKenzie et al. | 1—139 |
| 3,071,775 | 1/1963 | Strout | 1—138 |

GRANVILLE Y. CUSTER, Jr., *Primary Examiner.*